(12) United States Patent
Atarashi et al.

(10) Patent No.: US 7,072,381 B2
(45) Date of Patent: Jul. 4, 2006

(54) PATH SEARCH METHOD, CHANNEL ESTIMATION METHOD AND COMMUNICATION DEVICE

(75) Inventors: Hiroyuki Atarashi, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 670 days.

(21) Appl. No.: 09/926,089

(22) PCT Filed: Dec. 27, 2000

(86) PCT No.: PCT/JP00/09313

§ 371 (c)(1),
(2), (4) Date: Aug. 28, 2001

(87) PCT Pub. No.: WO01/48959

PCT Pub. Date: Jul. 5, 2001

(65) Prior Publication Data

US 2004/0071193 A1    Apr. 15, 2004

(30) Foreign Application Priority Data

Dec. 28, 1999  (JP) .................................. 11-375797
Dec. 28, 1999  (JP) .................................. 11-375798

(51) Int. Cl.
*H04B 1/69*    (2006.01)
(52) U.S. Cl. ........................ 375/144; 375/148
(58) Field of Classification Search ................ 375/144, 375/148, 149, 130; 370/441, 442
See application file for complete search history.

(56) References Cited

U.S. PATENT DOCUMENTS

| | | | |
|---|---|---|---|
| 5,283,811 A | 2/1994 | Chennakeshu et al. ..... 375/233 |
| 5,805,648 A * | 9/1998 | Sutton ........................ 375/367 |
| 6,175,558 B1 | 1/2001 | Miya | |
| 6,208,632 B1 * | 3/2001 | Kowalski et al. ........... 370/335 |

(Continued)

FOREIGN PATENT DOCUMENTS

CA    2 260 227    8/2002

(Continued)

OTHER PUBLICATIONS

Abeda Performánce comparisons of coherent SC/DS-CDMA, MC/DS CDMA.and MC-CDMA methods in downlink broadband wireless packet transmission. Technical research report RCS99-130 the Institute of Electronics, Information and Communication Engineers Oct. 15, 1999.*

(Continued)

*Primary Examiner*—Jay K. Patel
*Assistant Examiner*—Juan Alberto Torres

(74) *Attorney, Agent, or Firm*—Oblon, Spivak, McClelland, Maier & Neustadt, P.C.

(57) ABSTRACT

A communication device includes at least one of path search means for detecting respective timings of path components included a signal received via a multipath propagation path using pilot symbols of a known phase included in said received signal and channel estimation means for estimating channel variation using the pilot symbols. The path search means includes a first path search part for detecting respective timings of path components using pilot symbols and a second path search part for detecting respective timings of path components using information symbols derived from a signal demodulated according to the timings detected in the first path search part and pilot symbols. The channel estimation means includes a pilot symbol acquiring part for acquiring pilot symbols included in the received signal and a channel estimation part for implementing channel estimation using the acquired pilot symbols.

19 Claims, 29 Drawing Sheets

U.S. PATENT DOCUMENTS

| | | | |
|---|---|---|---|
| 6,240,099 B1 * | 5/2001 | Lim et al. | 370/441 |
| 6,430,166 B1 * | 8/2002 | Bejjani et al. | 370/320 |
| 6,466,606 B1 * | 10/2002 | Jou | 375/130 |
| 6,661,835 B1 * | 12/2003 | Sugimoto et al. | 375/148 |
| 6,700,919 B1 * | 3/2004 | Papasakellariou | 375/130 |
| 6,804,264 B1 * | 10/2004 | Song | 370/500 |

FOREIGN PATENT DOCUMENTS

| | | | |
|---|---|---|---|
| JP | 9-8770 | | 1/1997 |
| JP | 10-233713 | | 9/1998 |
| JP | 11-68700 | | 3/1999 |
| JP | 2000-252867 | | 9/2000 |
| JP | 2001-53644 | | 2/2001 |
| JP | 2001053644 | * | 2/2001 |
| JP | 2001053644 A | * | 2/2001 |
| KR | 2000-0046044 | | 7/2000 |
| KR | 2000-0046184 | | 7/2000 |
| KR | 2001-0054456 | | 7/2001 |
| KR | 10054456 | * | 7/2001 |

OTHER PUBLICATIONS

S. Abeta, et al., Technical Report of IEICE. A P99-133, RCS99-130, vol. 99, No. 357, pp. 63-70, "Performance Comparisons of Coherent SC/DS-CDMA, MC/DS-CDMA, MC-CDMA on Down-Link Broadband Radio Packet Transmission," Oct. 15, 1999 (Submitting English translation only).

H. Atarashi, et al., Technical Report of IEICE. A P99-134, RCS99-131, vol. 99, No. 357, pp. 71-77, "Performance Comparisons of Coherent SC/DS-CDMA, MC/DS-CDMA on Up-Link Broadband Radio Packet Transmission," Oct. 15, 1999 (submitting English translation only).

T. Kumagai, et al., Proceedings of the B-5-91 of Communications Society Meeting, the Institute of Electronics, Information and Communication Engineers, pp. 326, "An Improved Channel Equalization Scheme for OFDM Wireless LAN Systems," Aug. 16, 1999 (submitting English translation only).

A. Higashi, et al., Technical Report of IEICE A P94-74, RCS94-98, vol. 94, No. 312, pp. 57-62, "Performance of Coherent Rake Detection Using Interpolation on DS/CDMA," Oct. 28, 1994 (submitting English translation only).

T. Ishii, et al., Proceedings B-5-27 of General Meeting, The Institute of Electronics, Information and Communication Engineers, pp. 414, "Repeatedly Updated Channel Estimation for DS-CDMA with Decision Feedback and Extrapolation," Mar. 6, 1997 (submitting English translation only).

M. Nakamura, et al., Proceedings B-5-60 of Communication Society Meeting, the Institute of Electronics, Information and Communication Engineers, pp. 310, "A Study of Decision Feedback Channel Estimation for W-CDMA," Sep. 7, 1998 (submitting English translation only).

* cited by examiner

IMPLEMENT CHANNEL ESTIMATION BY COMBINING PILOT SYMBOLS OF PACKET TRANSMITTED FROM THE SAME TRANSMITTER

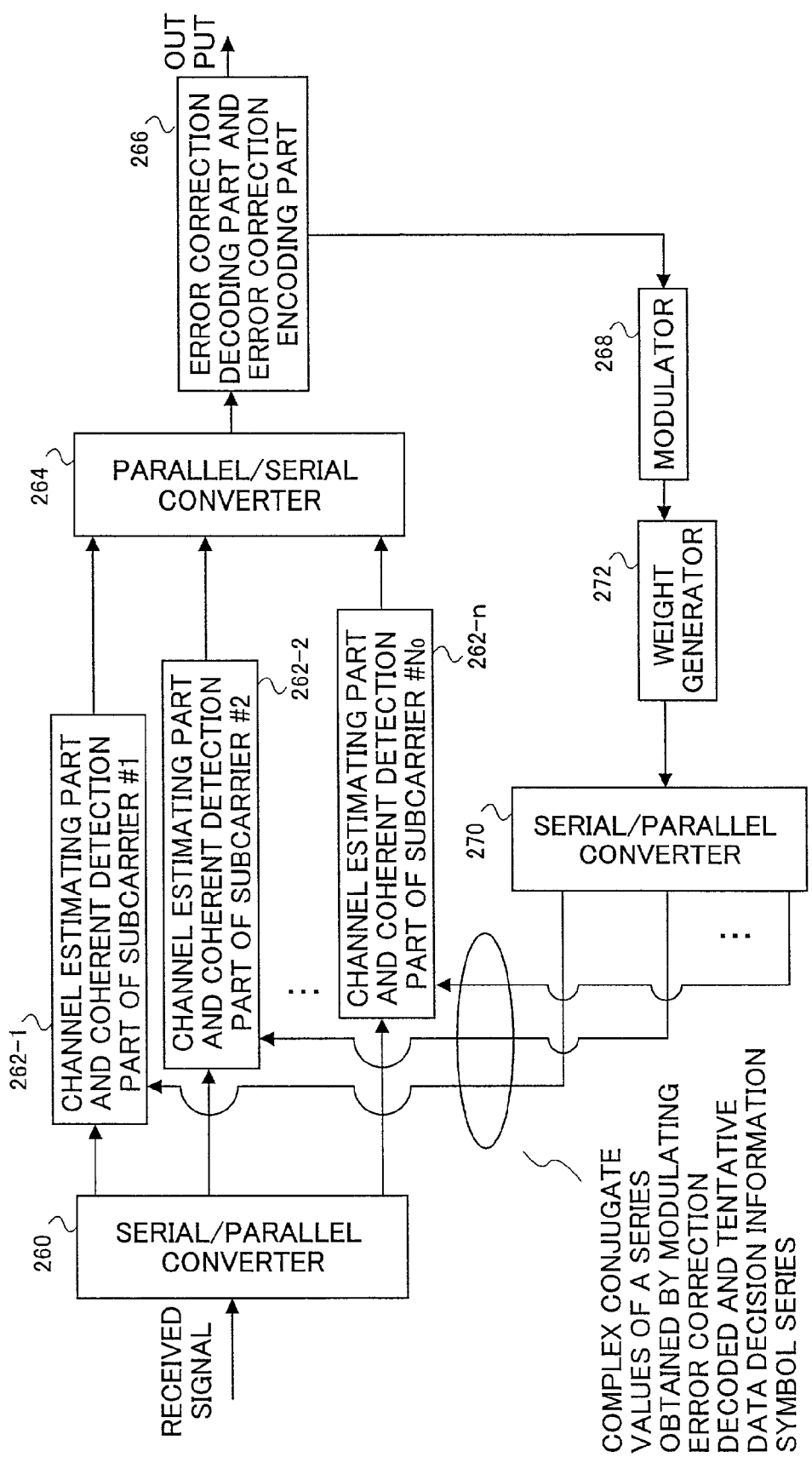

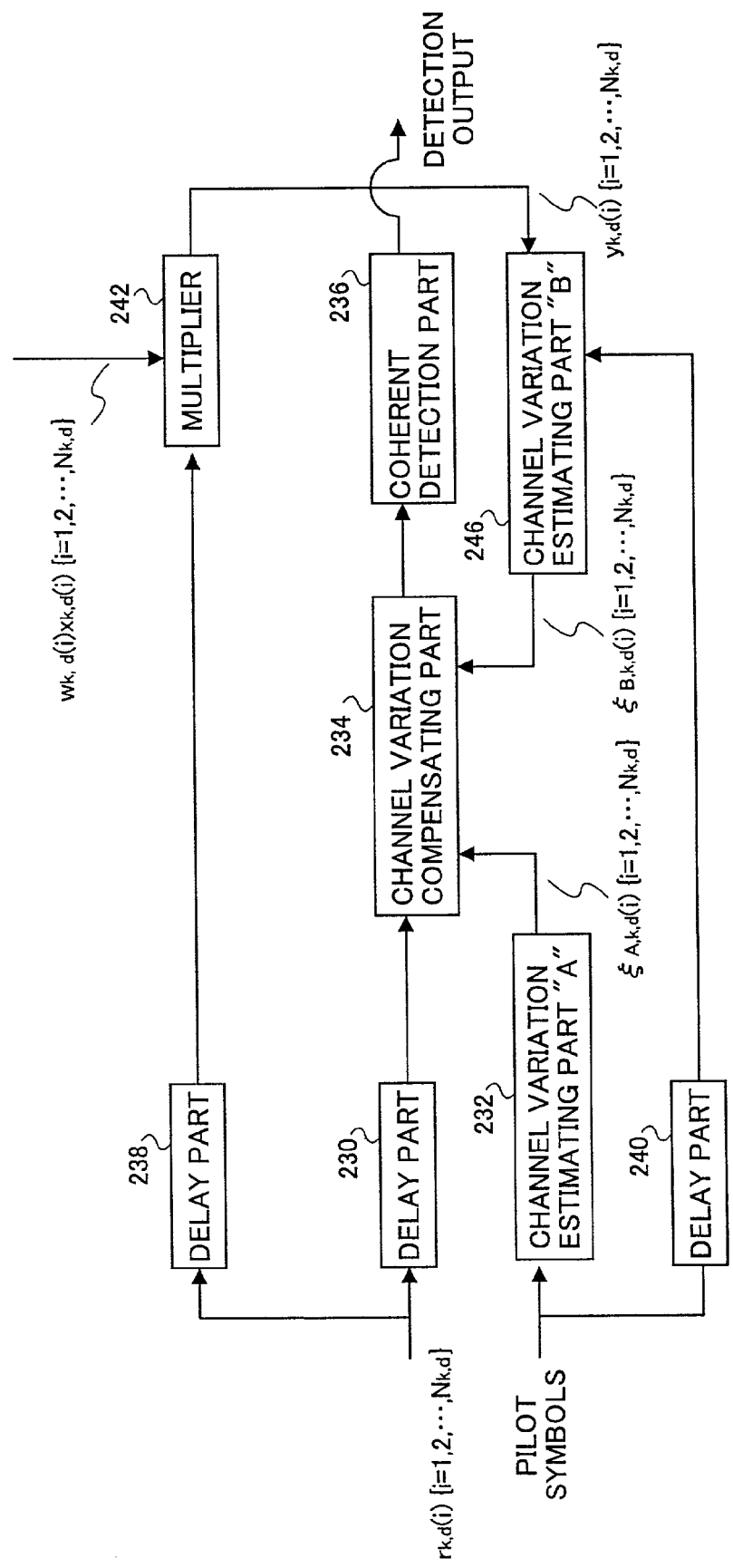

PATH SEARCH METHOD, CHANNEL ESTIMATION METHOD AND COMMUNICATION DEVICE

TECHNICAL FIELD

The present invention relates to a path search method, a channel estimation method and a communication device, and particularly relates to a path search method used for RAKE reception, to a communication device using such a path search method and to a channel estimation method for estimating channel variation and a communication device using such a channel estimation method.

BACKGROUND ART

Recently, CDMA (Code Division Multiple Access) system has become one of the mobile communication systems of a greater interest. CDMA system is a communication technology based on Spread Spectrum technology.

Generally, in a mobile communication environment, since a signal transmitted from a transmitter reaches to a receiver via a plurality of propagation paths, i.e., a so-called a multipath propagation path, a received signal is composed of a sum of multipath signals. Therefore, the received signal is composed of signal components having various time-of-arrivals, amplitudes and phases.

When a communication between a base station and mobile stations is based on CDMA, a so-called RAKE combining reception is possible, in which a signal received via a multipath propagation path is resolved into path components having different delay times and then combined after cophasing. Improved transmission characteristics of the RAKE combining reception may be achieved by improving a desired signal-to-power ratio against interference and thermal noise. Therefore, one of the most important technologies in the CDMA system is a path search method for detecting multipath timings with a considerably high accuracy for resolving into path components in a proper manner.

An example of a proposed prior art path search method may be found in an article "Path-Search Performance of DS-CDMA System in Laboratory and Field Experiments (Aoyama, Mizuguchi, Yoshida and Atokawa: The Technical Research Report of the Institute of Electronics, Information and Communication Engineers, RCS 97–164, pp. 51-58, November 1999)".

According to this proposed path search method, timing detection of a path is implemented by performing a correlation calculation process, an averaging process of correlated values, and a peak detection process, using pilot symbols of a known phase which are periodically inserted in a received signal. In the correlation calculation process, in order to derive a symbol correlation value, a despreading process is performed by multiplying the pilot symbols of the received signal by a spread code. Further, based on the fact that the phase of the pilot symbols is known, the above-mentioned symbol correlation values are summed after cophasing, and then the values obtained from the summation after cophasing are power-summed for a fixed time duration.

Using a sequence of symbol correlation values (instantaneous delay profile) extracted by the above-described processes, a peak detection process is implemented for selecting paths available for RAKE combining. First of all, a path having the maximum level selected as a first path from the sequence of symbol correlation values. Then, as a second path, a path having the maximum level is selected from the symbol correlation values having a timing at a distance of more than at least r-chips of spread codes separate from the timing of the first path. Path selection is implemented in a similar manner for a third path and so on.

A further path search method of a prior art is, for example, proposed in an article, "Experiments on Path Search Performance of Coherent RAKE Receiver for W-CDMA Mobile Radio (Fukumoto, Ohkawa, Andoh, Sawahashi and Adachi: The Technical Research Report of the Institute of Electronics, Information and Communication Engineers, RCS 98-30, pp. 41–48, May 1998)".

According to the proposed path search method, pilot symbols within a single slot are summed after cophasing to derive an instantaneous channel estimation value, and then the channel estimation values of successive two slots are cophased, summed and squared, so as to extract an instantaneous power delay profile. After extracting and averaging instantaneous power delay profiles of a plurality of slots, upper N paths having greater signal powers within the averaged power delay profile are regarded as a desired signal, and the power obtained by averaging the remaining paths excluding the upper N paths is assumed as a noise power Pn.

A power level of a factor of M of the noise power Pn is taken as a threshold value for path selection, and paths having signal powers exceeding this threshold are selected as paths of RAKE combining.

However, the above-mentioned path search method applies to a circuit-switched system in which, for a communication between mobile stations and a base station, signals continuously exist throughout a period from the start to the end of transmission.

Therefore, as in the case of signal transmission based on packets, in which the signals do not exist continuously but are transmitted intermittently, the above-mentioned path search method may give rise to a problem that an averaging process in a fixed period of time cannot be implemented and thus resulting a reduced path search accuracy.

Now, for a mobile communication system, a phenomenon called fading may occur due to a change in the relative position between a mobile station and a base station. Fading is a phenomenon in which an intensity of the received electric field temporally changes according to the state of a medium serving as a passage of an electric wave. Due to the fading phenomenon, the signals are received with their amplitude and phase being varied. Therefore, for an absolute coherent detection system in which information symbols are demodulated from absolute phase of the received signal, it is necessary to provide a method of accurately estimating the variation of amplitude and phase, i.e., a so-called channel variation, and compensating the channel variation.

Conventionally, as a channel estimation method for implementing absolute coherent detection, a method is proposed which uses pilot symbols having known phase. According to this channel estimation method, the pilot symbols having known phase are transmitted by being periodically multiplexed with the transmitted signals, and at the receiving end, the channel variation of the received signal is estimated using the pilot signals. Then, based on the result of the estimation, a channel variation of information symbols other than the pilot symbols is estimated. Generally, the channel variation of information symbols can be estimated by temporally interpolating the channel variation obtained from the periodically inserted pilot symbols.

For example, in the article "An Analysis of Pilot Symbol Assisted Modulation for Rayleigh Fading Channels" (J. K. Cavers: IEEE Transactions on Vehicular Technology, pp. 686–693, vol. 40, no. 4, November 1991)", a method is proposed in which an amount of channel variation between pilot symbols is interpolated using a Wiener filter.

Also, in the article "Rayleigh Fading Compensation for QAM in Land Mobile Ratio Communications" (S. Sampei and T. Sunaga: IEEE Transactions on Vehicular Technology, pp. 1370147, vol. 42, no. 2, May 1993)", a channel estimation method is proposed in which a low-level Gaussian interpolation is used for interpolation. Other methods, such as those using linear interpolation, are also proposed.

Also, in order to improve an accuracy of channel estimation, a method is proposed in which an absolute coherent detection is implemented using only the pilot symbols, and the tentative data decision information symbols are remodulated and fed back. After that, the received signals are multiplied by the complex conjugate of the fed-back symbols, and modulation components are removed to generate non-data modulated information symbols, and these symbols as well as the pilot symbols are both used for implementing channel estimation in a repeated manner.

Such a method is, for example, described in "Symbol-Aided Plus Decision-Directed Reception for PSK/TCM Modulation on Shadowed Mobile Satellite Fading" (G. T. Irvine and P. J. McLane: IEEE Journal on Selected Areas in Communications, pp. 1289–1299, vol. SAC-10, October 1992)".

Also, in order to reduce the data decision error of the tentative data decision information symbols, a method is known in which the information symbols are performed after error correction decoding process. In this case, tentative data decision is implemented after absolute coherent detection using only the pilot symbols and after an error correction decoding process.

For example, such a method is described in "Performance of Coherent Detection with Decision Feedback Interpolation and Viterbi Decoding on DS/CDMA" (Azuma, Taguchi and Ohno: The Proceedings of the 1994 Autumn Conference of the Institute of Electronics, Information and Communication Engineers, B-305".

However, the above-mentioned channel estimation method using pilot symbols is aimed for use in a situation where channels are always assigned by a circuit-switched system during a communication between a mobile station and a base station and signals are continuously transmitted and received.

However, with a packet wireless access system in which information symbols are transmitted/received in a format called packets, signals are intermittently transmitted and received during the communication between a mobile station and a base station. That is to say, the pilot symbols cannot be periodically multiplexed as in the case of the circuit-switched system.

Also, with the above-mentioned channel estimation method which uses both the pilot symbols and the information symbols wherefrom the modulation components are removed, the tentative data decision information symbols are remodulated and are all fed back. However, in a mobile communication system, since the reliability of the received signal varies due to noise, interference signals, etc., it is not preferable to remodulate the tentative data decision information symbols and feedback all of them.

DISCLOSURE OF THE INVENTION

Accordingly, it is a general object of the present invention to provide new and useful path search method, channel estimation method and communication device in which the above-mentioned problems are eliminated.

It is a first and more specific object of the present invention to provide a path search method which can be used for RAKE reception and can implement high-accuracy path search irrespective of the continuity of the transmission signal and a communication device using such a path search method.

It is a second and more specific object of the present invention to provide a channel estimation method which can implement high-accuracy channel estimation irrespective of the continuity of the transmission signal and a communication device using such a channel estimation method.

It is a still another object of the present invention to provide a path search method for detecting respective timings of path components included a signal received via a multipath propagation path, the method including the steps of: a first path search step for detecting respective timings of path components using pilot symbols of a known phase included in the signal received via the multipath propagation path; and a second path search step for detecting respective timings of path components using information symbols derived from a signal demodulated according to the timings detected in the first path search step and the pilot symbol of a known phase. According to the path search method of the present invention, since respective timings of the path components are detected by searching a path using pilot symbols of a known phase, and timings of each path component are detected again using the information symbol derived from a signal demodulated according to the thus-obtained timings and pilot symbols of a known phase, the path search accuracy can be improved. Thus, the above-mentioned first object of the invention is achieved.

In view of an aspect that it is efficient to firstly implement path search using pilot symbols of a known phase and then implementing path search again using the result of the path search and using the pilot symbols and the information symbols, in the path search method described above, the information symbols derived from the signal demodulated according to the timings detected in the first path search step may be generated by: despreading the signal received via the multipath propagation path according to the timings detected in the first path search step; cophasing and summing the information symbols despreaded according to the respective path timings in a symbol by symbol manner; demodulating the cophased and summed respective information symbols and implementing data decision thereof; and remodulating the data decision signals. With such a path search method, despreading is implemented according to the timings detected in the first path search step, the result of the despreading process is cophased and summed, and the cophased and summed information symbols are demodulated. Also, a cophasing and summing operation may be carried out by, for example, RAKE combining. By remodulating the demodulated signal and feeding back and using it in the second path search, respective timings of the path components may be detected with an increased accuracy.

In view of an aspect that the modulated information symbols having relatively high reliability are selected and used, the information symbols derived from the signal demodulated according to the timings detected in the first path search step are selected and fed back such that information symbols satisfying a predetermined condition are selected. Accordingly, since modulated information symbols having relatively high reliability are selected and used for path search, respective timings of the path components may be detected with an increased accuracy.

In view of an aspect that accuracy is improved by repeatedly implementing path search, in the path search method described above, the second path search step may be repeated until a predetermined condition is satisfied. Accordingly, implementing demodulation again using the path search result of an improved accuracy, the data decision result accuracy may be improved. Then, by feeding back the data decision result of an improved accuracy and repeating path search again, the path search accuracy is further improved and results in a further improvement of the data decision result.

In view of an aspect of extending the field of use, in the path search method described above, the signal received via the multipath propagation path may be transmitted in accordance with a multicarrier code division multiplex system.

It is still another object of the present invention to provide a channel estimation method for estimating channel variation using pilot symbols, the method including: a pilot symbol acquiring step for acquiring pilot symbols of a known phase included in a received packet; and a channel estimation step for implementing channel estimation using the acquired pilot symbols. According to the channel estimation method of the present invention, by using the pilot symbols of a known phase for channel estimation, a high-accuracy channel estimation is possible irrespective of the continuity of the transmission signals. Thus, the above-mentioned second object of the invention is achieved.

In the channel estimation method described above, the pilot symbol of a known phase may be time-multiplexed on the packet. In such a case, the pilot symbol of a known phase may be transmitted by time-multiplexing it on the packet.

In the channel estimation method described above, the pilot symbols of a known phase may be code-multiplexed with the packet. Thus, the pilot symbols of a known phase may be transmitted by code-multiplexing it with the packet.

In the channel estimation method described above, the channel estimation step implements channel estimation by combining the pilot symbols of a known phase and pilot symbols included in other packets transmitted from the same transmission source. Thus by implementing channel estimation by combining pilot symbols of a known phase and pilot symbols included in other packets transmitted from the same transmission source, channel estimation accuracy may be improved.

It is a further object of the present invention to provide a channel estimation method for estimating channel variation using pilot symbols, the method including: a pilot symbol acquiring step for acquiring pilot symbols of a known phase included in a common control channel in a multiplexed manner; and a channel estimation step for implementing channel estimation using the acquired pilot symbols. According to the channel estimation method of the present invention, since the pilot symbols of a known phase included in a common control channel in a multiplexed manner can be used for channel estimation, a high-accuracy channel estimation is possible irrespective of the continuity of the transmission signals. Thus, the above-mentioned second object of the invention can be achieved.

In the channel estimation method describe above, the pilot symbols of a known phase may be time-multiplexed with the common control channel. In such a case, the pilot symbols of a known phase may be transmitted by time-multiplexing it with the packet.

In the channel estimation method describe above, the pilot symbols of a known phase may be code-multiplexed with the common control channel. In such a case, the pilot symbol of a known phase may be transmitted by code-multiplexing it with the packet.

In the channel estimation method describe above, the channel estimation step may implement channel estimation by combining the pilot symbols of a known phase and pilot symbols included in other packets transmitted from the same transmission source. Accordingly, by implementing channel estimation by combining the pilot symbols of a known phase and pilot symbols included in other packets transmitted from the same transmission source, channel estimation accuracy may be improved.

It is a further object of the present invention to provide a channel estimation method for estimating channel variation using pilot symbols, the method including: a first pilot symbol acquiring step for acquiring pilot symbols of a known phase included in a packet and in a common control channel in a multiplexed manner; a second pilot symbol acquiring step for acquiring pilot symbols of a known phase included in the common control channel; and a channel estimation step for implementing channel estimation using the acquired pilot symbols. According to the channel estimation method of the present invention, the pilot symbols of a known phase included in the received packet and in the common control channel in a multiplexed manner may be acquired at the receiving side. Therefore, by implementing channel estimation using the pilot symbols of a known phase included in the received packet and in the common control channel, channel estimation accuracy may be improved. Thus, the above-mentioned second object of the invention can be achieved.

It is a further object of the present invention to provide a channel estimation method for estimating channel variation using pilot symbols, the method including: a pilot symbol acquiring step for acquiring pilot symbols of a known phase included in a received packet; a tentative channel estimation step for implementing tentative channel estimation using the acquired pilot symbols; a tentative data decision information symbol generating step for compensating for the channel variation in accordance with a result of the tentative channel estimation and generating a tentative data decision information symbols from the compensated information symbols; and a channel estimation step for generating an information symbols wherefrom modulation components are removed using the tentative data decision information symbols and implementing channel estimation using the pilot symbols and information symbols. According to the channel estimation method of the present invention, tentative channel estimation is implemented using pilot symbols and then channel estimation is implemented using the pilot symbols and information symbols. Thus, the above-mentioned second object of the invention can be achieved.

In the channel estimation method described above, the tentative data decision information symbol generating step may include a weighting process for weighting the tentative data decision information symbols according to the reliability. Accordingly, by implementing a weighting process for weighting the tentative data decision information symbols according to the reliability, the channel estimation accuracy can be improved.

In the channel estimation method described above, the tentative data decision information symbol generating step may include an error correction process for error correction decoding of the tentative data decision information symbols and error correction encoding again. Accordingly, by including an error correction process for error correction decoding of the tentative data decision information symbols and error correction encoding again, the channel estimation accuracy can be improved.

In the channel estimation method described above, the tentative data decision information symbol generating step may include a weighting process for weighting the error correction coded tentative data decision information symbols according to the reliability. Accordingly, by weighting the error correction coded tentative data decision information symbols according to the reliability, the channel estimation accuracy can be further improved.

It is a further object of the present invention to provide a channel estimation method for estimating channel variation using pilot symbols, the method including: a subcarrier acquiring step for acquiring a plurality of subcarriers included in a received packet; a pilot symbol acquiring step for acquiring a plurality of pilot symbols of known phase included in the plurality of subcarriers, respectively; and a channel estimation step for implementing channel estimation for each of the subcarriers using the plurality of pilot symbols. According to the channel estimation method of the present invention, such a method may be applied to a multicarrier transmission system since a plurality of pilot symbols of known phase included in the plurality of subcarriers, respectively are acquired and channel estimation for each of the subcarriers is implemented using the plurality of pilot symbols.

As has been described above, the pilot symbols of a known phase multiplexed with either the packet or on the common control channel can be used in the above-described path search method.

It is a further object of the present invention to provide a communication device including: path search means for detecting respective timings of path components included in a received signal received via a multipath propagation path using pilot symbols of a known phase included in the received signal; and channel estimation means for estimating channel variation using the pilot symbols. According to the communication device of the present invention, the above-mentioned first and second objects of the invention can be achieved.

The path search means may include: a first path search part for detecting respective timings of path components using the pilot symbols; and a second path search part for detecting respective timings of path components using an information symbols derived from a signal demodulated according to the timings detected in the first path search part and the pilot symbols. In such a case, respective timings of the path components can be detected with a high-accuracy. Thus, a communication device capable of performing high-accuracy RAKE combing reception can be realized.

The channel estimation means may include: a pilot symbol acquiring part for acquiring pilot symbols included in the received signal; and a channel estimation part for implementing channel estimation using the acquired pilot symbols. In such a case, a communication device capable of performing high-accuracy channel estimation can be realized irrespective of the continuity of the transmission signals.

The channel estimation part may include: a tentative channel estimation part for implementing tentative channel estimation using the acquired pilot symbols; a tentative data decision information symbol generating part for compensating for the channel variation in accordance with a result of the tentative channel estimation and generating a tentative data decision information symbols from the compensated information symbols; and a channel estimation part for generating information symbols wherefrom modulation components are removed using the tentative data decision information symbols and implementing channel estimation using the pilot symbols and information symbols.

The pilot symbol acquiring part may include: a subcarrier acquiring part for acquiring a plurality of subcarriers included in the received signal; and a pilot symbol acquiring step for acquiring a plurality of pilot symbols of known phase included in the plurality of subcarriers, respectively, and, the channel estimation part may implement channel estimation for each of the subcarriers using the plurality of pilot symbols.

It is a further object of the present invention to provide a communication device for implementing path search for detecting respective timings of path components included a signal received via a multipath propagation path, the device including: a first path search part for detecting respective timings of path components using pilot symbols of a known phase included in the signal received via the multipath propagation path; and a second path search part for detecting respective timings of path components using information symbols derived from a signal demodulated according to the timings detected in the first path search step and the pilot symbols of a known phase. According to the communication device of the present invention, the above-mentioned first object of the invention can be achieved.

It is a further object of the present invention to provide a communication device for implementing channel estimation for estimating channel variation using pilot symbols, the device including: a pilot symbol acquiring part for acquiring pilot symbols of a known phase included in a received packet; and a channel estimation part for implementing channel estimation using the acquired pilot symbols. According to the communication device of the present invention, the above-mentioned second object of the invention can be achieved.

It is a further object of the present invention to provide a communication device for implementing channel estimation for estimating channel variation using pilot symbols, the device including: a pilot symbol acquiring part for acquiring pilot symbols of a known phase included in a common control channel in a multiplexed manner; and a channel estimation part for implementing channel estimation using the acquired pilot symbols. According to the communication device of the present invention, the above-mentioned second object of the invention can be achieved.

It is a further object of the present invention to provide a communication device for implementing channel estimation for estimating channel variation using pilot symbols, the device including: a first pilot symbol acquiring part for acquiring pilot symbols of a known phase included in a packet and in a common control channel in a multiplexed manner; a second pilot symbol acquiring part for acquiring pilot symbols of a known phase included in the common control channel; and a channel estimation part for implementing channel estimation using the acquired pilot symbols. According to the communication device of the present invention, the above-mentioned second object of the invention can be achieved.

It is a further object of the present invention to provide a communication device for implementing channel estimation for estimating channel variation using pilot symbols, the device including: a pilot symbol acquiring part for acquiring pilot symbols of a known phase included in a received packet; a tentative channel estimation part for implementing tentative channel estimation using the acquired pilot symbols; a tentative data decision information symbol generating part for compensating for the channel variation in accordance with a result of the tentative channel estimation and generating a tentative data decision information symbols from the compensated information symbols; and a channel estimation part for generating information symbols wherefrom modulation components are removed using the tentative data decision information symbols and implementing channel estimation using the pilot symbols and information symbols. According to the communication device of the present invention, the above-mentioned second object of the invention can be achieved.

It is a further object of the present invention to provide a communication device for implementing channel estimation for estimating channel variation using pilot symbols, the device including: a subcarrier acquiring part for acquiring a plurality of subcarriers included in a received packet; a pilot symbol acquiring part for acquiring a plurality of pilot symbols of known phase included in the plurality of subcarriers, respectively; and a channel estimation part for implementing channel estimation for each of the subcarriers using the plurality of pilot symbols. According to the communication device of the present invention, the above-mentioned second object of the invention can be achieved.

The objects described above may be achieved by a communication device including: path search means for performing a first path search step in which respective timings of path components are detected using pilot symbols of a known phase included in a reception signal received via a multipath propagation path; and channel estimation means for performing a first channel estimation step in which channel estimation is implemented for estimating channel variation after the first path search step, the path search means implementing a second path search step in which respective timings of path components are detected using information symbols derived from a signal demodulated after the first channel estimation step according to the timings detected in the first path search step and the pilot symbols of a known phase, and the channel estimation means implementing a second channel estimation step in which channel estimation is implemented for estimating channel variation using information symbols derived from a signal demodulated after the first channel estimation step according to the timings detected in the second path search step and the pilot symbols of a known phase, and thereafter, recursively implementing path search and channel estimation by repeating the processes of implementing the second path search step using the information symbols demodulated after the second channel estimation step and pilot symbols and implementing the second channel estimation step using information symbols fed back in accordance with the timing detected in the second path search step and pilot symbols. According to the communication device of the present invention, the above-mentioned first and second objects of the invention can be achieved.

The pilot symbols may be included in at least one of a packet and a common control channel of the received signal and may be multiplexed on at least one of the packet and the common control channel.

The objects described above may be achieve by a communication device including path search and channel estimation means for implementing at least one of path search and channel estimation using pilot symbols of a known phase or an information symbols included in at least one of a packet and a common control channel of a received signal. According to the communication device of the present invention, at least one of the above-mentioned first and second objects of the invention can be achieved.

The pilot symbols may be included in at least one of a packet and a common control channel of the received signal.

Also, the communication device may further include feedback means for feeding back the information symbols, and the path search and channel estimation means may recursively implement path search and channel estimation by repeating processes of implementing path search using information symbols decoded after channel estimation and pilot symbols and implementing channel estimation using information symbols fed back via the feedback means in accordance with a timing detected in the path search and pilot symbols.

Further objects and advantages of the present invention will be elucidated from the explanation described below with reference to the following drawings.

BRIEF DESCRIPTION OF THE DRAWINGS

FIG. 28 is a block diagram showing a configuration of an eleventh embodiment of a channel estimation part of the communication device of the first embodiment; and FIG. 29 is a block diagram showing a configuration of a channel estimation part implemented for each of the sub-carrier sequence in the eleventh embodiment of the channel estimation part.

BEST MODE OF CARRYING OUT THE INVENTION

In the following, embodiments of a path search method, a channel estimation method and a communication device of the present invention will be described with reference to the accompanying drawings.

Figure 1:
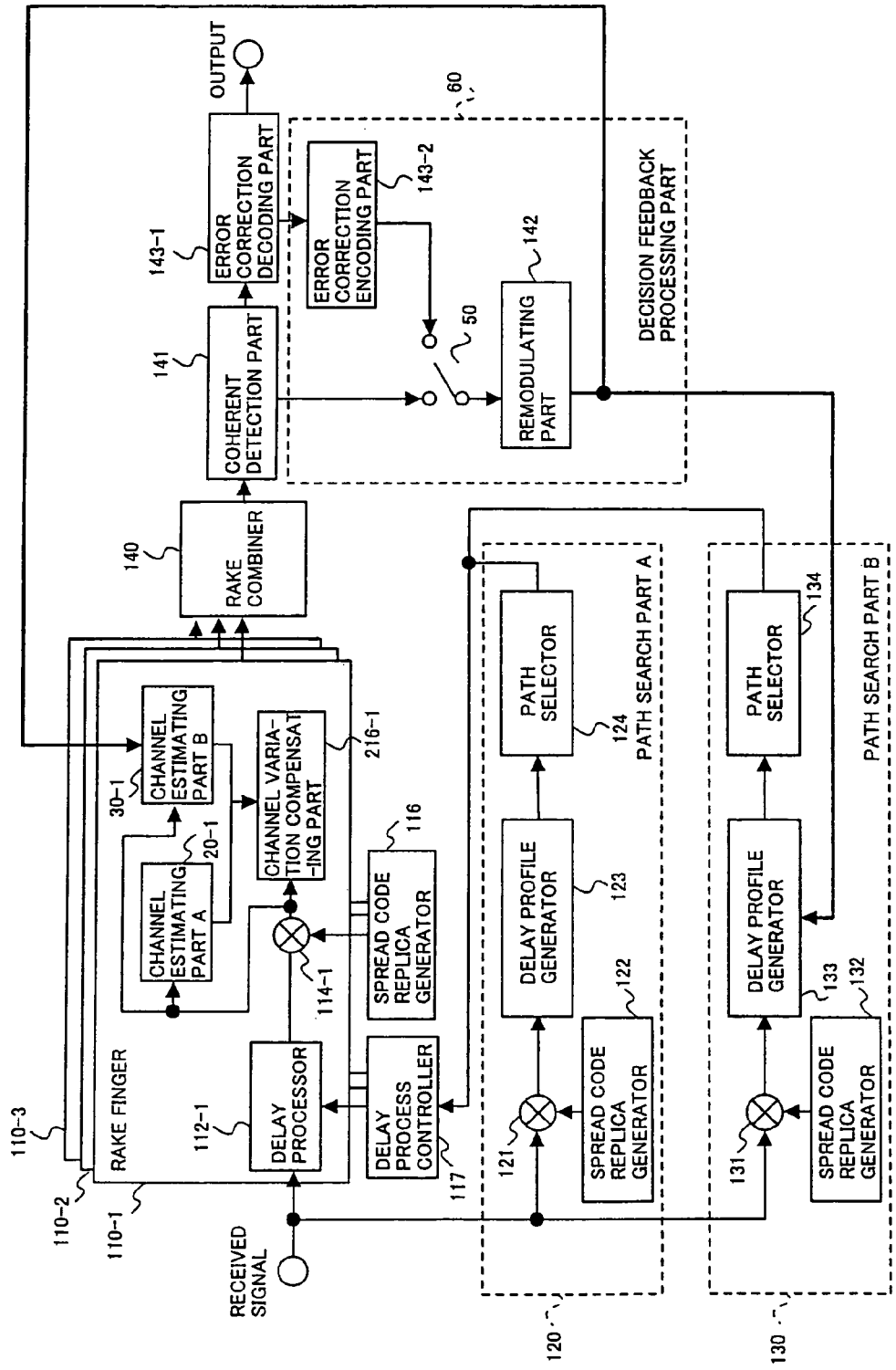
FIG. 1 is a block diagram showing a general configuration of a first embodiment of a communication device of the present invention.

FIG. 1 is a block diagram showing a general configuration of a first embodiment of a communication device of the present invention. A communication device 1 generally includes a path search part A 120, a path search part B 130, a spread code replica generator 116, a delay process controller 117, RAKE finger circuits 110-1 to 110-3, a RAKE combiner 140, a coherent detection part 141, a remodulating part 142, an error correction decoding part 143-1, an error correction encoding part 143-2 and a switch 50, which are connected as shown in the figure. Signals are received through a multipath propagation path via elements such as an antenna, a frequency converter, an analog/digital (A/D) converter and a memory, all of which are not shown, and are input to the path search part A 120, to the path search part B 130 and to the RAKE finger circuits 110-1 to 110-3.

The path search part A 120 generally includes a multiplier 121 whereto the received signals are supplied, a spread code replica generator 122, a delay profile generator 123 and a path selector 124 which generates an output of the path search part A 120. Similarly, the path search part B 130 generally includes a multiplier 131 whereto the received signals are supplied, a spread code replica generator 132, a delay profile generator 133 and a path selector 134 which generates an output of the path search part B 130. The outputs of the path search part A 120 and the path search part B 130 are supplied to the RAKE finger circuits 110-1 to 110-3 via the delay controller 117.

The RAKE finger circuits 110-1 to 110-3 each has the same configuration and the RAKE finger circuit 110-1 generally includes a delay processor 112-1, a multiplier 114-1, a channel estimating part A 20-1, a channel estimating part B 30-1 and a channel variation compensating part 216-1. Outputs of the RAKE finger circuits 110-1 to 110-3 are supplied to the RAKE combiner 140 via the channel variation compensating parts 216-1 to 216-3 (only 216-1 is shown in the figure) and are combined in the RAKE combiner, and then supplied to the coherent detection part 141. The coherent detection part 141 provides a detection output. The detection output obtained from the coherent detection part 141 is supplied to an error correction decoding part 143-1 which performs error correction decoding processes and outputs an error corrected and decoded output signal. The output signal from the error correction decoding part 143-1 is subjected to an error correction and encoding process at the error correction encoding part 143-2 and then supplied to the switch 50. The detection output from the coherent detection part 141 is also supplied to the switch 50. The output of the switch 50 is fed back, via the remodulating part 142, to the delay profile generator 133 of the path search part B 130 and to the channel estimating part B 30-1 to 30-3 (only 30-1 is shown in the figure) of the RAKE finger circuits 110-1 to 110-3. The remodulating part 142, the error correction encoding part 143-2 and the switch 50 form a decision feedback processor 60.

As will be described later, the first embodiment of the communication device is particularly characterized in configurations and operations of the path search part A 120, the path search part B 130 and the channel estimating parts A 20-1 to 20-3 (only 20-1 is shown) and the channel estimating parts B 30-1 to 30-3 (only 30-1 is shown) of the RAKE finger circuits 110-1 to 110-3.

In detail, the path search part A 120 and the path search part B 130 involve a first path search step and a second path search step and the RAKE finger circuits 110-1 to 110-3 involve a first channel estimating step and a second channel estimating step.

In the first path search step, when detecting respective timings of path components included in a received signal received via the multipath propagation path, the respective timings of the path components are detected using pilot symbols of a known phase which is included in the received signal. In the second path search step, respective timings of the path components are detected using an information symbol derived from a signal demodulated according to the timings detected in the first path search step and pilot symbols of a known phase. Accordingly, since respective timings of the path components are detected by searching a path using pilot symbols of known phase, and timings of each path component are detected again using the information symbol derived from a signal demodulated according to the thus-obtained timings and pilot symbols of a known phase, the path search accuracy can be improved.

On the other hand, the first and second channel estimating steps include, when estimating channel variation using pilot symbols, respectively, a pilot symbol acquiring step for acquiring pilot symbols of a known phase included in the received signal and a channel estimating step for implementing channel estimation using the acquired pilot symbols. In the second channel estimating step, channel estimation is implemented using information symbols derived from the signal demodulated according to the timings detected in the first channel estimating step and the pilot symbols of a known phase. Thus, by using the information symbols and the pilot symbols of a known phase for channel estimation, channel estimation can be implemented at a high accuracy irrespective of the continuity of the transmission signal.

It is to be noted that the fed-back information symbols used in path search and channel estimation steps need not be different for path search and channel estimation steps but can be shared, so as to further improve the path search accuracy and the channel estimation accuracy.

That is to say, path search and channel estimation steps can be recursively implemented by performing the first path search step for detecting respective timings of path components using pilot symbols of a known phase included in the received signal received via the multipath propagation path, performing the first channel estimating step for estimating the channel variation after the first path search step, performing the second path search step for detecting respective timing of path components using information symbols derived from a signal demodulated according to the timings detected in the first path search step and pilot symbols of a known phase, performing the second channel estimating step for implementing channel estimation in which channel variation is estimated using the information symbols derived from a signal demodulated via the first channel estimating step according to the timings detected in the first path search step and pilot symbols of a known phase, and thereafter repeating the second path search step using information symbols demodulated after the second channel estimation step and pilot symbols and the second channel estimation step using information symbols fed back via the decision feedback processor 60 according to the timings detected in the second path search step. Accordingly, since path search and channel estimation are implemented in a recursive manner, in other words mutually complementarily, the path search accuracy and the channel estimation accuracy can be further improved.

Figure 2:
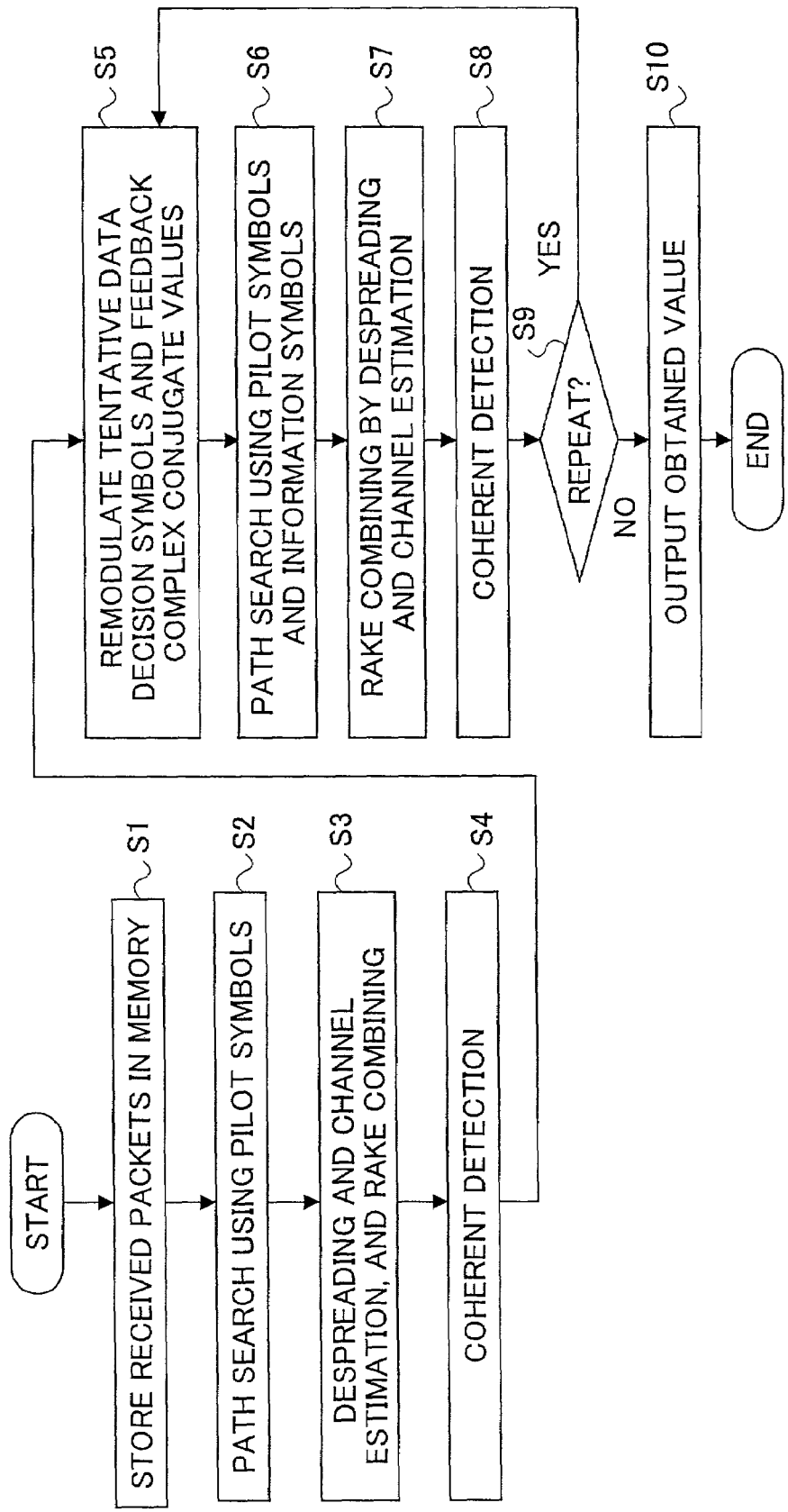
FIG. 2 is a flowchart for explaining process steps carried out by the communication device of the first embodiment.

FIG. 2 is a flowchart for explaining process steps carried out by the communication device of the first embodiment. In FIG. 2, at step S1, a received packet signal is stored in a memory. After storing the received packet signal into the memory, path search is implemented using pilot symbols of a known phase, at step S2. After path search, a despreading process and a channel estimation process are applied to the received signal according to receiving timings of the selected path, and then RAKE combining is implemented, at step S3.

At step S4, the RAKE combined signal is demodulated by coherent detection and then a tentative data decision of information symbols is implemented. Then, at step S5, the tentative data decision information symbols are modulated and complex conjugate values thereof are fed back for path search. As step 6, path search is implemented using both the pilot symbols and the information symbols using the fact that the phase of the pilot symbols is known and the phase of the information symbols may be known by multiplying them by the fed-back complex conjugate values.

After path search, at step S7, despreading process and channel estimating process are applied to the received signal at receiving timings of the newly selected path and then RAKE combining is implemented. Then, at step S8, the RAKE combined signal is demodulated by coherent detection.

At step S9, it is determined whether or not to repeat the path search step, and, if the result of determination is YES, the method returns to step S5 and implements tentative data decision of the information symbols, modulates the tentative data decision information symbols and feedbacks the complex conjugate values thereof for path search. On the other hand, if the result of determination at step S9 is NO, the data decision result is output at step S10, and the process ends.

As has been described above, path search and channel estimation may be implemented in a recursive manner, in other words, mutually complementary, by performing path search of step S2 and channel estimation of step S7 in the order of the first path search step→the first channel estimation step→the second path search step→the second channel estimation step→the second channel path search step →the second channel estimation step→the second channel path search step→the second channel estimation step . . . , so that the path search accuracy and the channel estimation accuracy may be further improved.

As has been described above, the path search accuracy can be improved by implementing a tentative data decision of the information symbols by implementing path search and channel estimation using the pilot symbols, and then, repeating the path search using the tentative data decision information symbols and the pilot symbols.

Then, using the path search result of an improved accuracy, a despreading process is implemented again, and the channel estimation process and the RAKE combining process are implemented using the tentative data decision information symbols and the pilot symbols, and the RAKE combined signal is demodulated by coherent detection, thereby, an accuracy of the data decision result can be improved. Also, by feeding back the data decision result of an improved accuracy and by repeating the path search step again, the path search accuracy is improved, and as a result, the data decision result will be further improved. Accordingly, by recursively repeating a sequence of processes of path search, despreading, and channel estimation, both accuracies can be improved in a mutually affecting manner.

Figure 3:
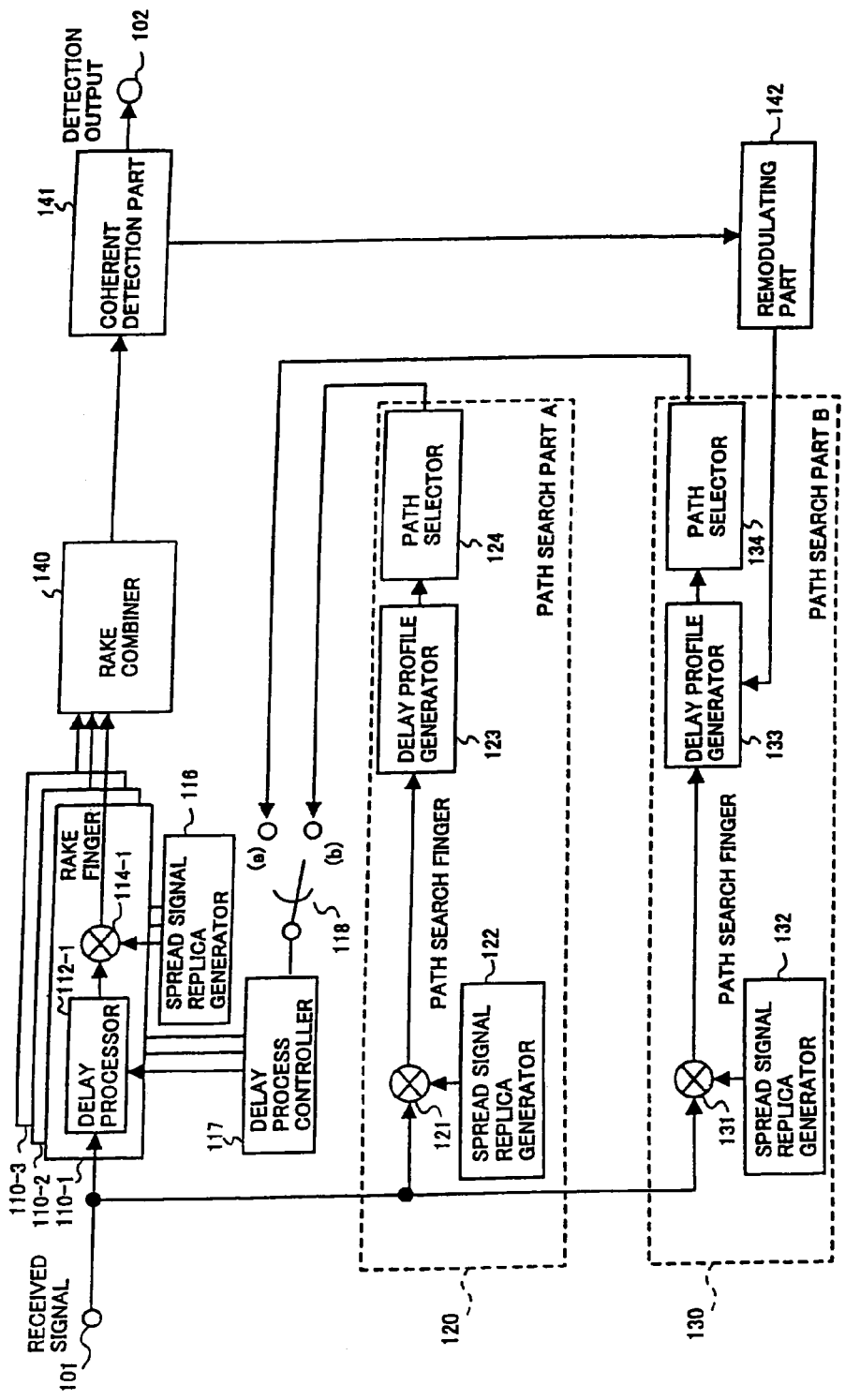
FIG. 3 is a block diagram showing a configuration of a first embodiment of a path search part of the communication device of the first embodiment.

FIG. 3 is a block diagram showing a configuration of a first embodiment of a path search part of the communication device of the first embodiment. The first embodiment of the path search part adopts a first embodiment of a path search method of the present invention and each of the second to seventh embodiments of the path search parts described later adopts second to seventh embodiments of the path search method of the present invention. In FIG. 3, elements similar to those shown in FIG. 1 are indicated with corresponding reference numerals.

Referring to FIG. 3, the received packet signal is stored in a memory (not shown), and then, via a terminal 101, supplied to the RAKE finger circuits 110-1 to 110-3, to the path search part A 120 and to the path search B 130. It is to be noted that, in the present embodiment, a circuit arrangement with three fingers is shown as an example, but in general, there may be any natural number of n-RAKE finger circuits.

The path search part A 120 implements a despreading process at the multiplier 121 in such a manner that the pilot symbols of the supplied received packet signal are multiplied by the spreading code generated at the spread signal replica generator 122. The despreaded pilot symbols are cophased and summed at the profile generator 123, and a delay profile is generated.

The path selector 124 is supplied with the delay profile from the delay profile generator 123 and selects the paths to be RAKE combined. The path selector 124 supplies information of the selected paths to the delay process controller 117 via the switch 118. The switch 118 operates such that it is connected to a terminal (b) side when performing the steps S2 to S4 of FIG. 2 and connected to the terminal (a) side when performing the steps of S5–S9 of FIG. 2.

The delay process controller 117 controls the timings of despreading processes performed in the RAKE finger circuits 110-1 to 110-3 based on the timings of the paths selected in the path selector 124. In detail, the delay processors 112-1 to 112-3 serve to delay the supplied received packet signals based on instructions given by the delay process controller 117, and the despreading processes are implemented in the multipliers 114-1 to 114-3 by multiplying the supplied received packet signals by the spread code generated in the spread signal replica generator 116.

The despreaded signals are RAKE combined at the RAKE combiner 140. The RAKE combined signal is supplied to the coherent detection part 141 where the signal is demodulated and the tentative data decision of the information symbols is implemented. Thereafter, the tentative data decision information symbols are supplied to the remodulation part 142 for remodulating the information symbols, and the complex conjugate values thereof are fed back to the delay profile generator 133 of the path search part B 130.

The path search part B 130 despreads the pilot symbols and the information symbols of the received packet signal. As in the case of the path search part A 120, the pilot symbols and the information symbols are despreaded in the multiplier 131 such that the spread code generated at the spread signal replica generator 132 is multiplied thereto.

The despreaded symbols include the pilot symbols wherefrom the modulation components are removed using the fact that the phase is known. On the other hand, the despreaded symbols include the information symbols which are multiplied by the complex conjugate values fed back from the remodulation part 142 and from which the modulation components are removed. The delay profile generator 133 cophases and sums the values obtained by removing the modulation portions from the despreaded symbols so as to generate a delay profile.

The delay profile from the delay profile generator 133 is supplied to the path selector 134 where paths to be RAKE combined are selected. The path selector 134 supplies information related to the selected paths to the delay process controller 117 via the switch 118.

Based on the timings of the paths selected in the path selector 134, the delay process controller 117 controls the timing of despreading process performed in the RAKE finger circuits 110-1 to 110-3. In detail, the delay controller 112-1 to 112-3 serve to delay the supplied received packet signals based on instructions given by the delay process controller 117, and the despreading process is implemented in the multipliers 114-1 to 114-3 by multiplying the supplied received packet signals by the spread code generated in the spread signal replica generator 116.

The despreaded signals are RAKE combined at the RAKE combiner 140. The RAKE combined signal is supplied to the coherent detection part 141 where the signal is demodulated and the tentative data decision of the information symbols is implemented. The detection output from the coherent detection part 141 is outputted from the terminal 102.

A sequence of processes implemented in the path search B 130 using the above-mentioned tentative data decision result is repeated recursively for n-times (n: natural number). Thus, by recursively repeating the sequence of processes including path search, despreading and channel estimation, the path search accuracy and the data decision result accuracy can be improved in a mutually affecting manner.

It is to be noted that in FIG. 3, the spread signal replica generator 122, 132, the delay profile generators 123, 133 and the path selectors 124, 134 are provided as individual elements, but these may be shared.

Figure 4:
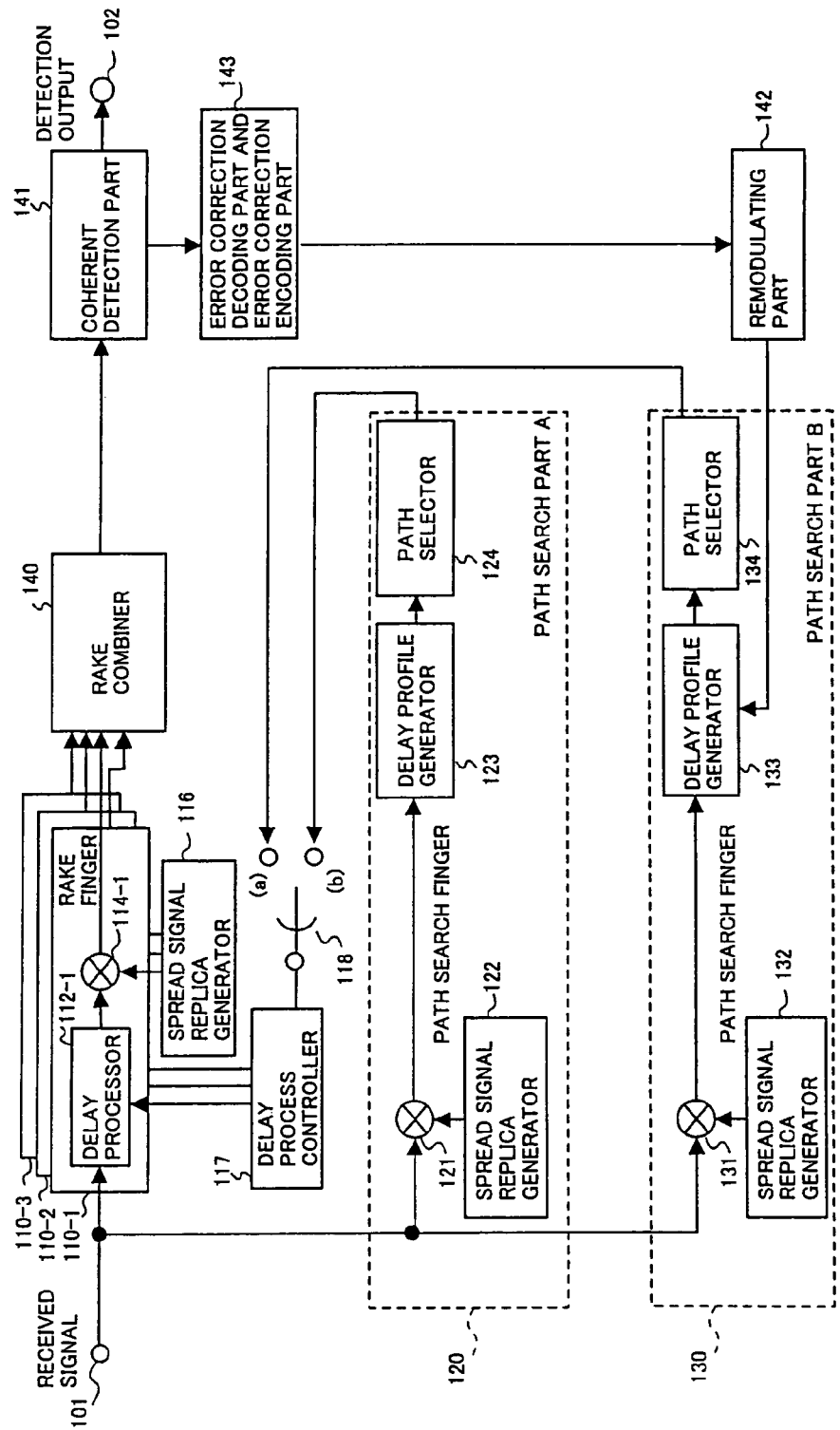
FIG. 4 is a block diagram showing a configuration of a second embodiment of a path search part of the communication device of the first embodiment.

FIG. 4 is a block diagram showing a configuration of a second embodiment of a path search part of the communication device of the first embodiment. In FIG. 4, elements similar to those shown in FIG. 3 are indicated with corresponding reference numerals and will not be explained in detail. Referring to FIG. 4, the error correction decoding part and the error correction encoding part 143 corresponds to the error correction decoding part 143-1 and the error correction encoding part 143-2 shown in FIG. 1.

The configuration of FIG. 4 is characterized in that, particularly, when error correction codes are included in the information symbols, an error correction decoding is implemented on the information symbols obtained by tentative data decision, and then an error correction encoding and remodulation are implemented again, and then fed back to the path search part.

After tentative data decision of the information symbols by the coherent detection part 141, the tentative data decision information symbols are supplied to the error correction decoding part and error correction encoding part 143, and then error correction decoding is implemented. The information symbols which have experienced error correction decoding is error correction coded again and is supplied to the remodulating part 142.

The remodulating part 132 remodulates the supplied information symbols and feeds back the complex conjugate values thereof to the delay profile generator 133 of the path search part B 130. Other processes are similar to those of the first embodiment of the path search part, and thus will not be explained in detail.

As has been describe above, with the error correction decoding part and error correction encoding part, when an error correction code is included in the information symbols, this error correction code can be effectively used for improving a path search accuracy and a data decision result accuracy.

Figure 5:
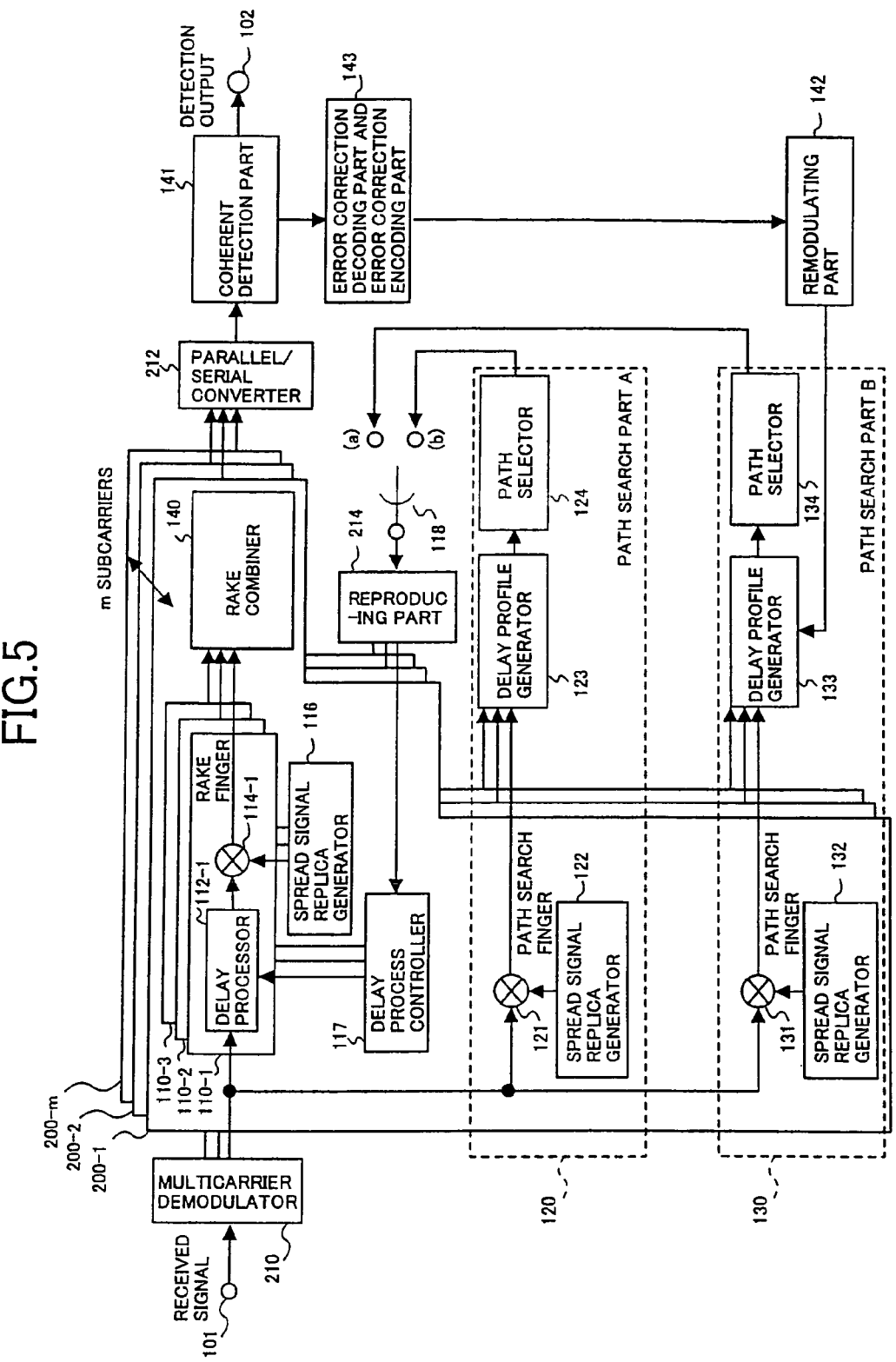
FIG. 5 is a block diagram showing a configuration of a third embodiment of a path search part of the communication device of the first embodiment.
Figure 6:
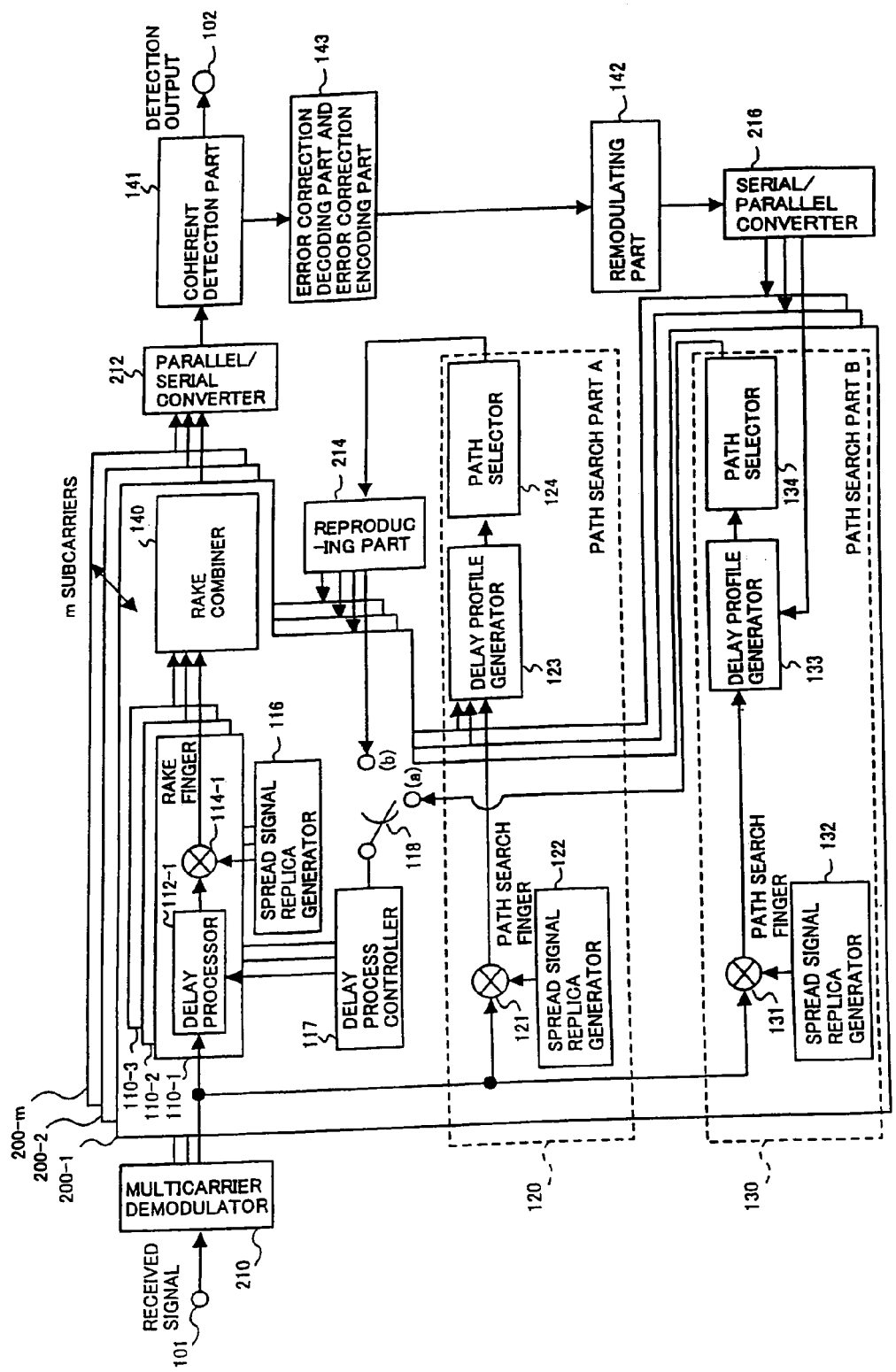
FIG. 6 is a block diagram showing a configuration of a fourth embodiment of a path search part of the communication device of the first embodiment.
Figure 7:
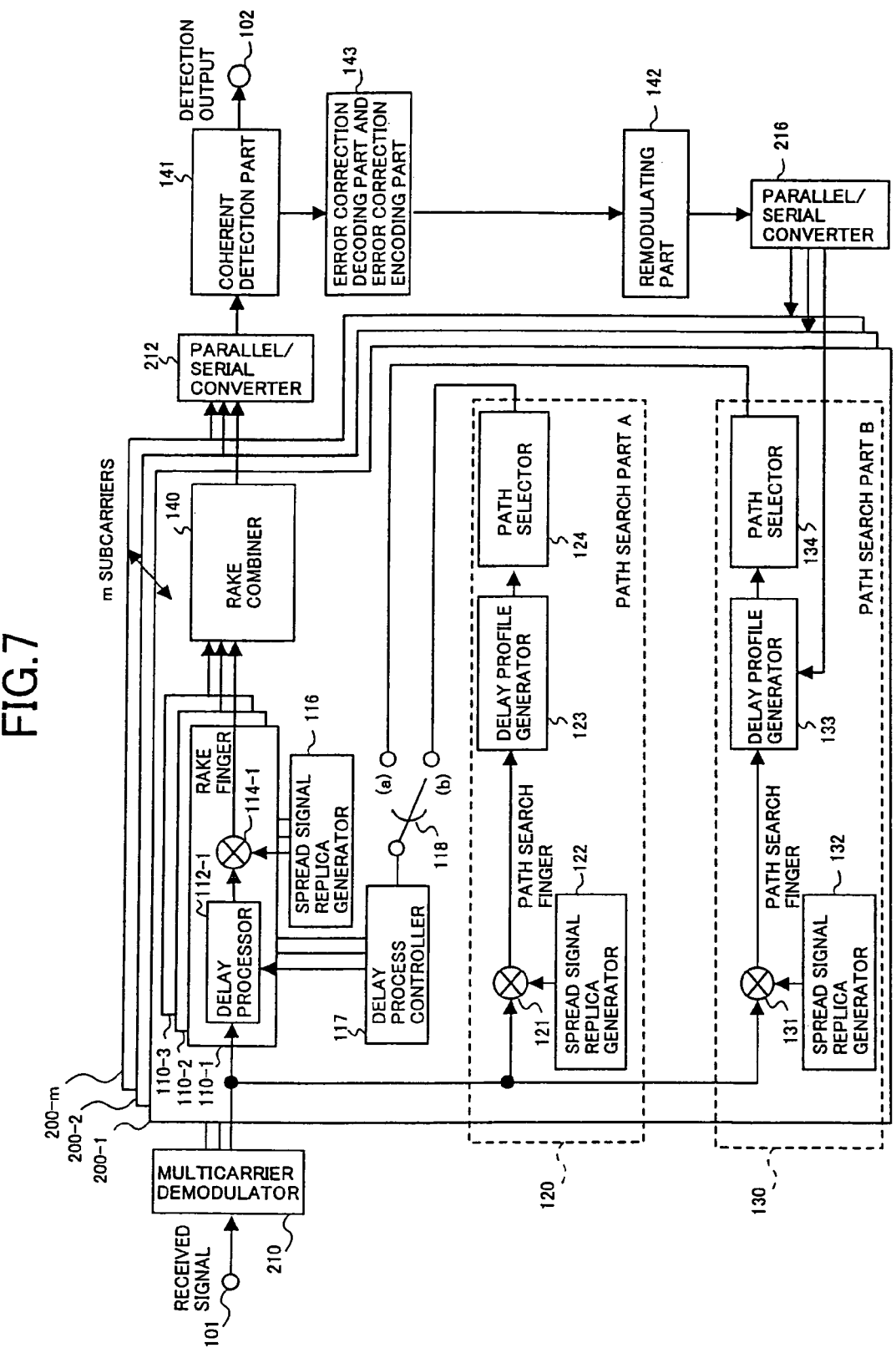
FIG. 7 is a block diagram showing a configuration of a fifth embodiment of a path search part of the communication device of the first embodiment.

Referring now to FIGS. 5 to 7, a path search part will be described for a case where a multicarrier transmission system is adopted.

FIG. 5 is a block diagram showing a configuration of a third embodiment of a path search part of the communication device of the first embodiment. In FIG. 5, elements similar to those shown in FIG. 4 are indicated with corresponding reference numerals and will not be explained in detail. It is to be noted that the configuration of FIG. 5 is adapted to a path search method according to a multicarrier CDMA system having m-subcarriers. With this multicarrier CDMA system, since signals for a plurality of mobile stations are multiplexed by CDMA for each subcarrier, it is necessary to implement path search for each subcarrier.

Referring to FIG. 5, the received packet signal is stored in a memory (not shown), and then supplied to a multicarrier demodulator 210 via the terminal 101. The multicarrier demodulator 210 resolves the supplies received packet signals into components of each subcarrier, and supplies to the circuits 200-1 to 200-m for each subcarrier component. It is to be noted that the multicarrier demodulator 210 may be realized using elements such as a discrete Fourier transformation device (DFT), fast Fourier transformation device (FFT) and filters.

The RAKE finger circuits 110-1 to 110-3, the path search part A 120 and the path search part B 130 included in the circuit 200-1 are supplied with signals of predetermined subcarriers from the multicarrier demodulator 210. In the present embodiment, a circuit arrangement with three fingers is shown as an example, but in general, there may be any natural number of RAKE finger circuits.

The path search part A 120 implements a despreading process at the multiplier 121 in such a manner that the pilot symbols of the supplied received packet signal are multiplied by the spreading code generated at the spread signal replica generator 122. The despreaded pilot symbols are supplied to the profile generator 123. Similarly, the despreaded pilot symbols are supplied from circuits 200-1 to 200-m to the profile generator 123.

The delay profile generator 123 cophases and sums the despreaded pilot symbols at each circuit 200-1 to 200-m for each subcarrier, and then sums the cophased and summed result for each subcarrier by power-summation, so as to generate a delay profile. The path selector 124 is supplied with the delay profile from the delay profile generator 123 and selects paths to be RAKE combined. The path selector 124 supplies information of the selected paths to a reproducing part 214 via the switch 118.

The reproducing part 214 reproduces the supplied path information and supplies them to the delay process controllers 117 of the circuits 200-1 to 200-m, respectively. It is to be noted that the switch 118 is connected to a terminal (b) side when performing the steps S2 to S4 of FIG. 2 and connected to the terminal (a) side when performing the steps of S5-S9 of FIG. 2.

The delay process controller 117 controls the timings of despreading process performed in the RAKE finger circuits 110-1 to 110-3 based on the timings of the paths selected in the path selector 124. In detail, the delay processors 112-1 to 112-3 serve to delay the supplied signal based on instructions given by the delay process controller 117, and the despreading process is implemented in the multipliers 114-1 to 114-3 by multiplying the supplied received packet signals by the spread code generated in the spread signal replica generator 116.

The signals which have been RAKE combined in the RAKE combiners 140 included in the circuits 200-1 to 200-m are supplied to a parallel-to-serial converter 212, and after being converted into a single sequence, supplied to the coherent detection part 141. The RAKE combined signal is supplied to the coherent detection part 141 where the signal is demodulated and tentative data decision of the information symbols is implemented.

After implementing tentative data decision of the information symbols by the coherent detection part 141, the tentative data decision information symbols are supplied to the error correction decoder and error correction encoder 143 where error correction decoding is implemented. Then, the error correction decoded information symbols are error correction coded again, and then supplied to the remodulating part 142. Then, the remodulating part 142 remodulates the supplied information symbols and feeds back the complex conjugate values thereof to the delay profile generator 133 of the path search part B 130.

It is to be noted that when error correction codes are not included in the information symbols, as in the first embodiment of the path search part, the tentative data decision information symbols may be remodulated and the complex conjugate values thereof may be fed back to the delay profile generator 133 of the path search part B 130.

The path search part B 130 implements a despreading process of pilot symbols and information symbols of a signal supplied for each subcarrier. As in the case of the path search part A 120, the despreading process is implemented by multiplying the pilot symbols and the information symbols of the supplied signal by a spread code generated at the spread signal replica generator 132.

The despreaded symbols include the pilot symbols wherefrom the modulation components are removed using the fact that the phase is known. On the other hand, the despreaded symbols include the information symbols which are multiplied by the complex conjugate values fed back from the remodulation part 142 and from which the modulation components are removed. The delay profile generator 133 cophases and sums the values obtained by removing the modulation portions from the despreaded symbols for each subcarrier and then sums the cophased and summed results for each subcarrier by power-summation so as to generate a delay profile.

The path selector 134 is supplied with the delay profile from the delay profile generator 133 and selects paths to be RAKE combined. The path selector 134 supplies information of the selected paths to a reproducing part 214 via the switch 118. The reproducing part 214 reproduces the supplied path information and supplies them to the delay process controllers 117 of the circuits 200-1 to 200-m, respectively.

The delay process controller 117 controls the timings of despreading process performed in the RAKE finger circuits 110-1 to 110-3 based on the timings of the paths selected in the path selector 134. In detail, the delay processors 112-1 to 112-3 serve to delay the supplied signal based on instructions given by the delay process controller 117, and the despreading process is implemented in the multipliers 114-1 to 114-3 by multiplying the supplied signals by the spread code generated in the spread signal replica generator 116. The despreaded signals are RAKE combined at the RAKE combiner 140.

The signals which have been RAKE combined in the RAKE combiners 140 included in the circuits 200-1 to 200-m are supplied to a parallel-to-serial converter 212, and after being converted into a single sequence, supplied to the coherent detection part 141. The RAKE combined signal is supplied to the coherent detection part 141 where the signal is demodulated and then the tentative data decision of the information symbols is implemented.

A process sequence described above performed in the path search part B 130 using the tentative data decision result is recursively repeated for n-cycles (n: natural number). Thus by recursively repeating a process sequence including path search, despreading and channel estimation, a path search accuracy and an accuracy of data decision can be improved in a mutually affecting manner in a multicarrier CDMA system.

FIG. 6 is a block diagram showing a configuration of a fourth embodiment of a path search part of the communication device of the first embodiment. In FIG. 6, elements similar to those shown in FIG. 5 are indicated with corresponding reference numerals and will not be explained in detail. The configuration of FIG. 6 is characterized in that the path search part B 130 implements despreading processes of pilot symbols and information symbols for each subcarrier, and implements delay profile generation and path selection.

The path selector 124 supplies information of the selected paths to a reproducing part 214. The reproducing part 214 reproduces the supplied path information and supplies them to the switches 118 of the circuits 200-1 to 200-m, respectively. It is to be noted that the switches 118 are connected to a terminal (b) side when performing the steps S2 to S4 of FIG. 2 and connected to the terminal (a) side when performing the steps of S5–S9 of FIG. 2.

In the present embodiment, a process similar to a process performed in the fourth embodiment of the path search part is implemented and the information symbols error correction coded again are supplied to the remodulating part 142. The remodulating part 142 remodulates the supplied information symbols and supplies complex conjugate values thereof to a serial-to-parallel converter 216. The serial-to-parallel converter 216 converts the supplied complex conjugate values to a plurality of sequences, and then feeds back the converted complex conjugate values to the delay profile generator 133 of the circuits 200-1 to 200-m, respectively.

The path search part B 130 despreads the pilot symbols and the information symbols of the supplied signal for each subcarrier. As in the case of the path search part A 120, the despreading processes are implemented in the multipliers 131 included in the circuits 200-1 to 200-m, respectively, such that the pilot symbols and the information symbols of the supplied signal are multiplied by the spread code generated at the spread signal replica generator 132.

The despreaded symbols include the pilot symbols wherefrom the modulation components are removed using the fact that the phase is known. On the other hand, the despreaded symbols include the information symbols which are multiplied by the complex conjugate values fed back from the remodulation part 142 and from which the modulation components are removed. The delay profile generator 133 cophases and sums the values obtained by removing the modulation portions from the despreaded symbols so as to generate a delay profile.

The path selectors 134 included in the circuits 200-1 to 200-m, respectively, are supplied with the delay profile from the delay profile generator 133 and select paths to be RAKE combined. The path selectors 134 supply information of the selected paths to the delay process controllers 117 via the switches 118.

Accordingly, since path information for each subcarrier are individually supplies to the delay process controllers 117, the timings of the dispreading processes are performed in the RAKE finger circuits 110-1 to 110-3 can be controlled for each subcarrier.

A process sequence described above performed in the path search part B 130 using the tentative data decision result is recursively repeated for n-cycles (n: natural number). Thus by recursively repeating a process sequence including path search, despreading and channel estimation, a path search accuracy and an accuracy of data decision can be improved in a mutually affecting manner in a multicarrier CDMA system.

FIG. 7 is a block diagram showing a configuration of a fifth embodiment of a path search part of the communication device of the first embodiment. In FIG. 7, elements similar to those shown in FIG. 6 are indicated with corresponding reference numerals and will not be explained in detail. The configuration of FIG. 7 is characterized in that the path search part A 120 and the path search part B 130 implement despreading processes of pilot symbols and informations symbol for each subcarrier.

When the despreaded pilot symbols are supplied, the profile generators 123 included in the circuits 200-1 to 200-m, respectively, implement cophasing and summing of the despreaded pilot symbols for each subcarrier, so as to generate a delay profile. The path selectors 124 included in the circuits 200-1 to 200-m, respectively, are supplied with the delay profiles from the delay profile generator 123 and selects paths to be RAKE combined. The path selector 124 supplies information of the selected paths to the delay process controllers 117 via the switch 118.

Accordingly, since the path information for each subcarrier are individually supplied to the delay controllers 117, the timings of the despreading processes performed in the RAKE finger circuits 110-1 to 110-3 can be controlled for each subcarrier.

A process sequence described above performed in the path search part B 130 using the tentative data decision result is recursively repeated for n-cycles (n: natural number). Thus by recursively repeating a process sequence including path search, despreading and channel estimation, a path search accuracy and an accuracy of data decision can be improved in a mutually affecting manner in a multicarrier CDMA system.

Figure 8:
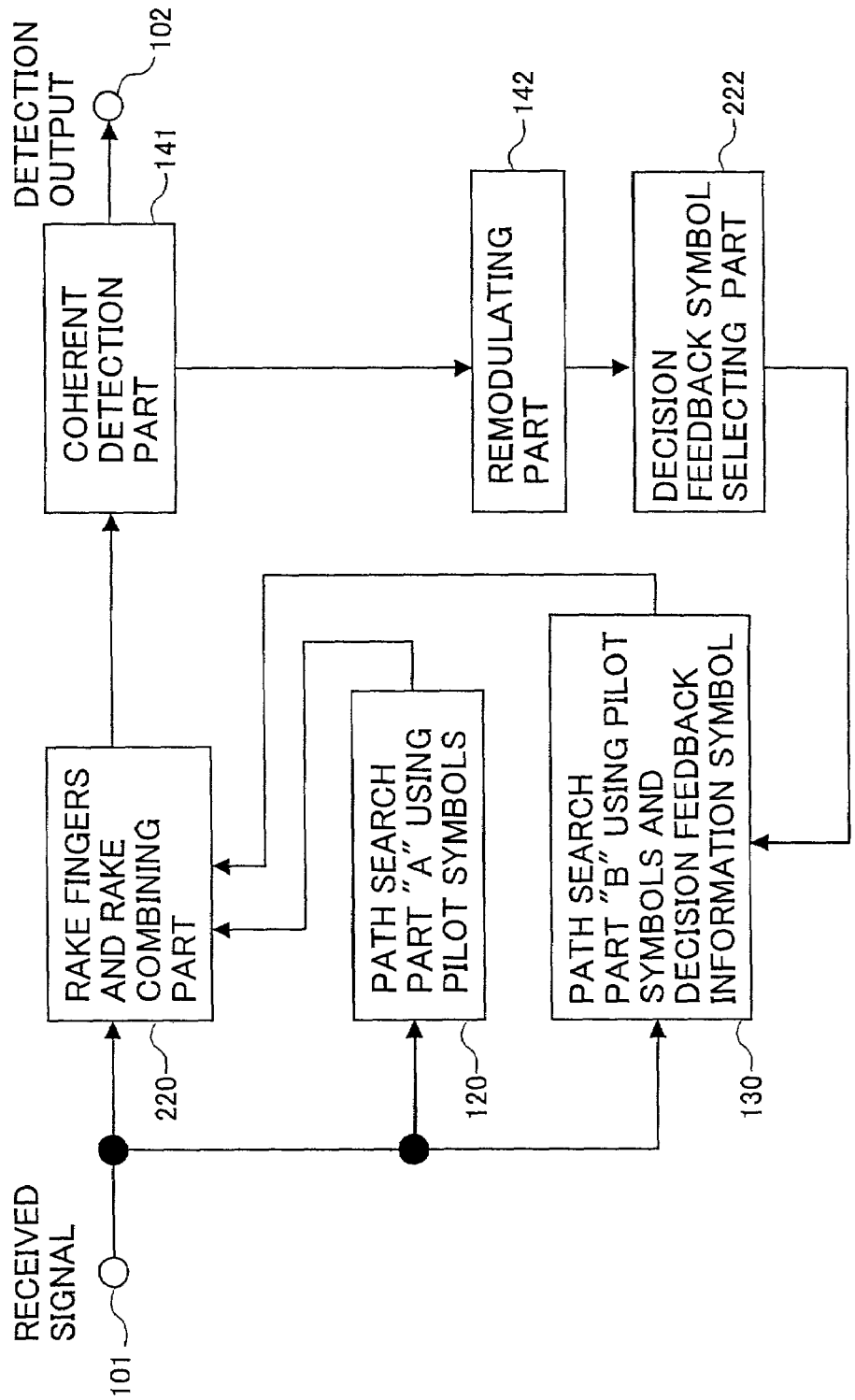
FIG. 8 is a block diagram showing a configuration of a sixth embodiment of a path search part of the communication device of the first embodiment.

FIG. 8 is a block diagram showing a configuration of a sixth embodiment of a path search part of the communication device of the first embodiment. It is to be noted that, in FIG. 8, the path search part 120, the structures of the path search part B 130 and a RAKE fingers and RAKE combiner 220 are illustrated in a simplified manner, these may be realized as, for example, the configuration shown in FIG. 4. The RAKE fingers and RAKE combiner 220 corresponds to the RAKE finger circuits 110-1 to 110-3 and the RAKE combiner 140. Also, in FIG. 8, elements similar to those shown in FIG. 3 are indicated with corresponding reference numerals and will not be explained in detail.

The remodulating part 142 remodulates the supplied information symbols and supplies complex conjugate values thereof to a decision feedback symbol selecting part 222. The decision feedback symbol selecting part 222 selects k symbols (k≦Nd, k: natural number) out of the supplied Nd symbols (Nd: natural number), and feeds back complex conjugate values thereof to the path search part B 130.

Accordingly, the decision feedback symbol selecting part 222 may select and feed back any successive k parts, may select and feed back any discrete k or may select and feed back all (k=Nd) of the Nd remodulated information symbols.

Also, when selecting k symbols, the symbols may be ranked in accordance with the reliability of the received symbols and may select and feed back in a descending order of the reliability, or may feed back after weighting the symbols in accordance with the reliability. For example, reception power of the received symbols may be used as the reliability of the received symbols.

As one embodiment, the reception power of the received symbols may be derived by multiplying the RAKE combined received symbols by the complex conjugate values of the tentative data decision result obtained from a demodulation process and squaring the value obtained by the multiplication.

Figure 9:
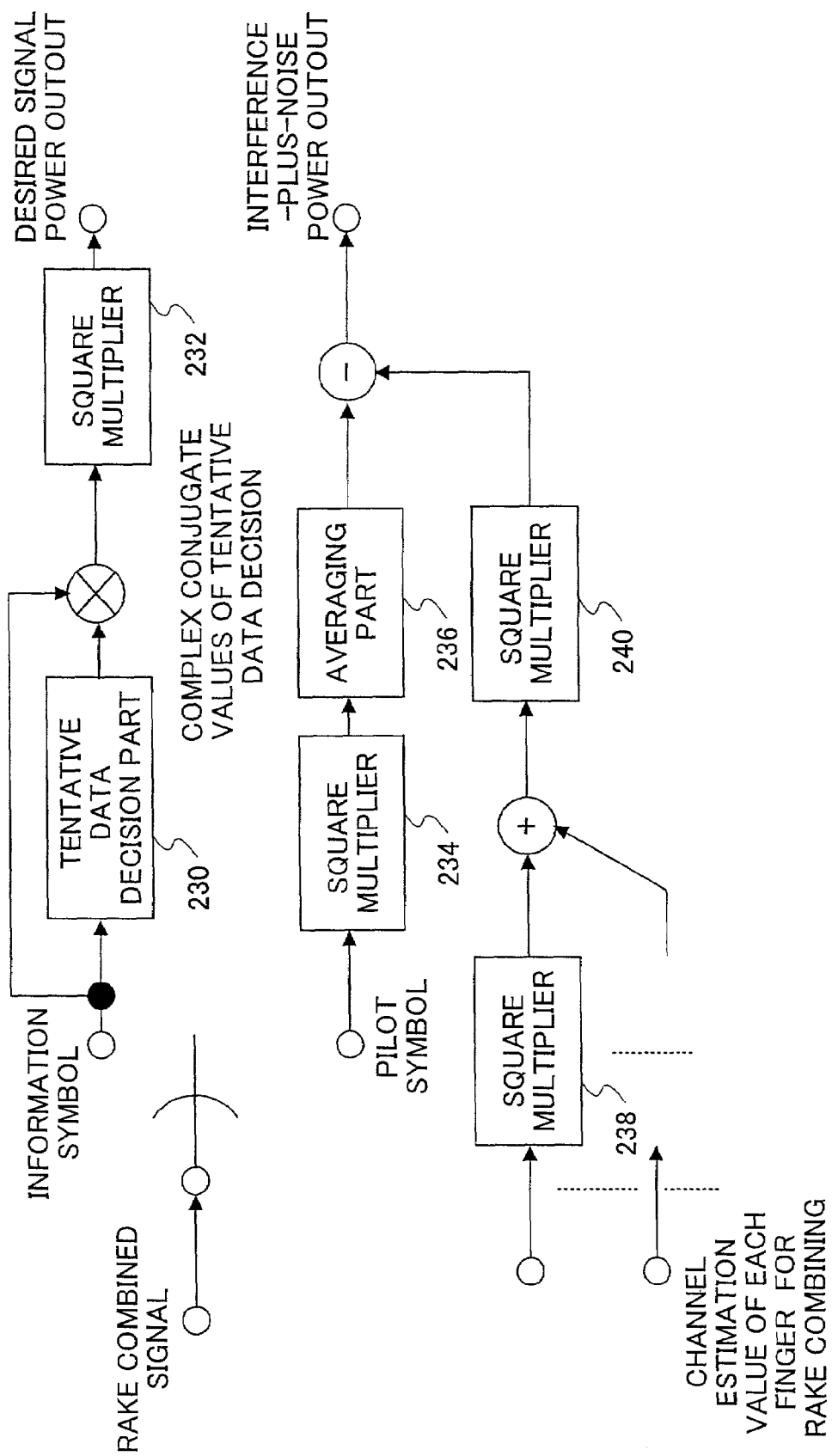
FIG. 9 is a block diagram showing a configuration for deriving the desired signal power versus interference-plus-noise power ratio.

As another embodiment, the reliability of the received symbols may be obtained using a desired signal power versus interference-plus-noise power ratio of the received symbols. One configuration for realizing this embodiment is a configuration shown in FIG. 9. FIG. 9 is a block diagram showing a configuration for deriving the desired signal power versus interference-plus-noise power ratio.

The desired signal power can be approximated by multiplying the RAKE combined received symbol by the complex conjugate values of the tentative data decision result of the tentative data decision part 230 and squaring the value obtained by the multiplication using a square multiplier 232. Also, the interference-plus-noise power may be approximated at each RAKE finger circuits using a square multiplier 240 by squaring the RAKE combined pilot symbols in the square multiplier 234 and squaring the sum of an average value obtained by averaging the result of the square multiplier 234 in an averaging part 236 and a squared value of a channel variation estimate value.

Figure 10:
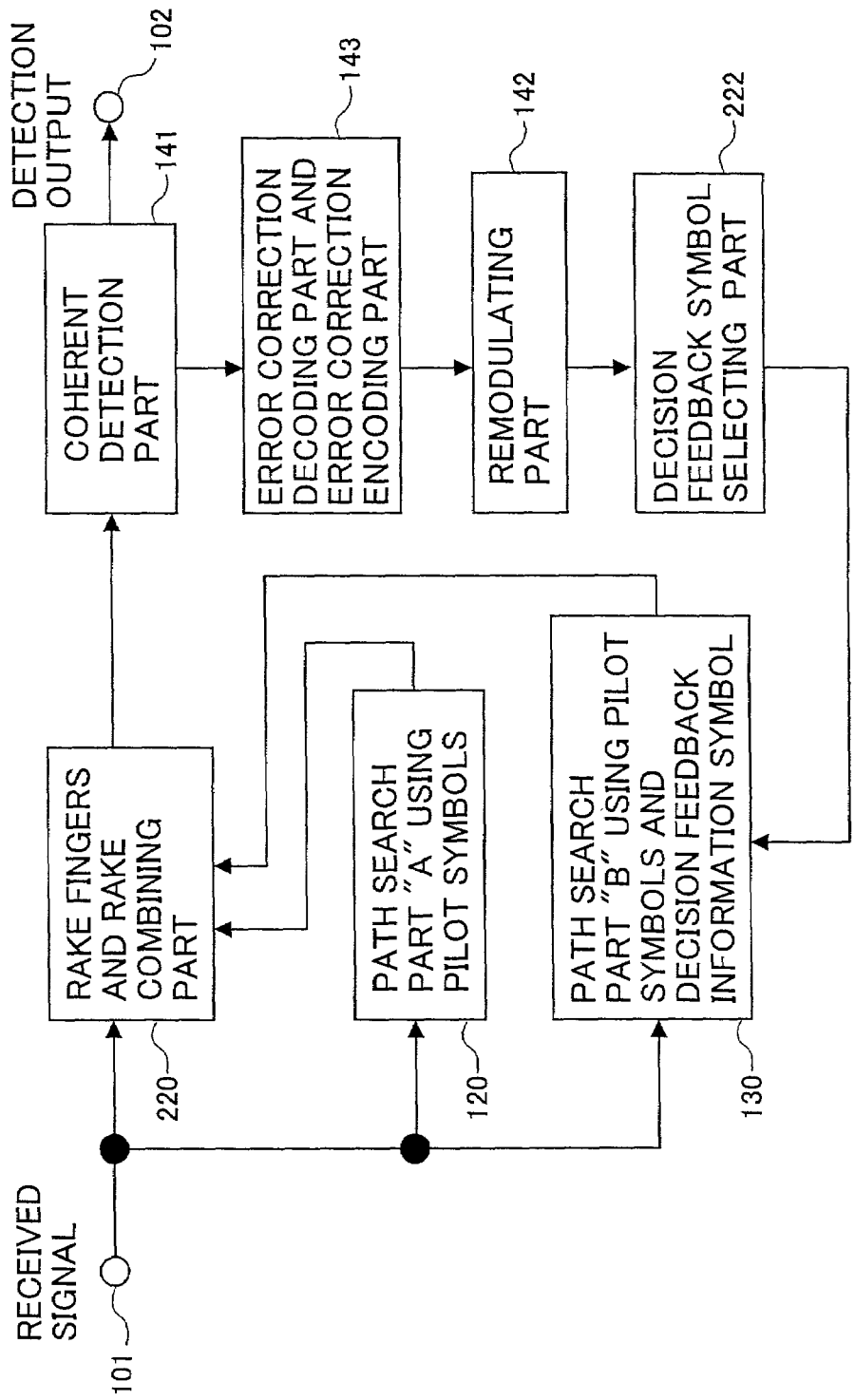
FIG. 10 is a block diagram showing a configuration of a seventh embodiment of a path search part of the communication device of the first embodiment.

FIG. 10 is a block diagram showing a configuration of a seventh embodiment of a path search part of the communication device of the first embodiment. In FIG. 10, elements similar to those shown in FIG. 8 are indicated with corresponding reference numerals and will not be explained in detail.

The configuration of FIG. 10 is characterized in that the error correction decoding part and the error correction encoding part 143 is provided between the coherent detection part 141 and the remodulating part 142. That is to say, according to the configuration of FIG. 10, when the information symbols include error correction codes, the information symbols obtained by tentative data decision are error correction decoded, error correction coded again, remodulated, and fed back. It is to be noted that, in FIG. 10, the structure of each part is illustrated in a simplified manner, but these may be realized as, for example, the configuration shown in FIG. 4.

The reliability of the received symbols may be obtained from the above-described reception power of the information symbols and the desired signal power versus interference-plus-noise power ratio or may be based on the likelihood ratio of the received signal used for error correction decoding. For example, when a convolution code is used as the error correction code, a value of a path metric calculated in a procedure of Viterbi decoding may be used as the reliability of the received signal.

As has been described above, with the present embodiment, since the timings of respective path components are detected by implementing path search of pilot symbols of a known phase, and the timings of respective path components are detected again using information symbols derived form the decoded signal according to thus-obtained timings and the pilot symbols, a path search accuracy can be improved.

Also, when demodulation is implemented again using the path search result of an improved accuracy, a data decision result accuracy can be improved. Further, when path search is repeated again by feeding back the data decision result of an improved accuracy, a path search accuracy is further improved and as a result the data decision result can be further improved.

Figure 11:
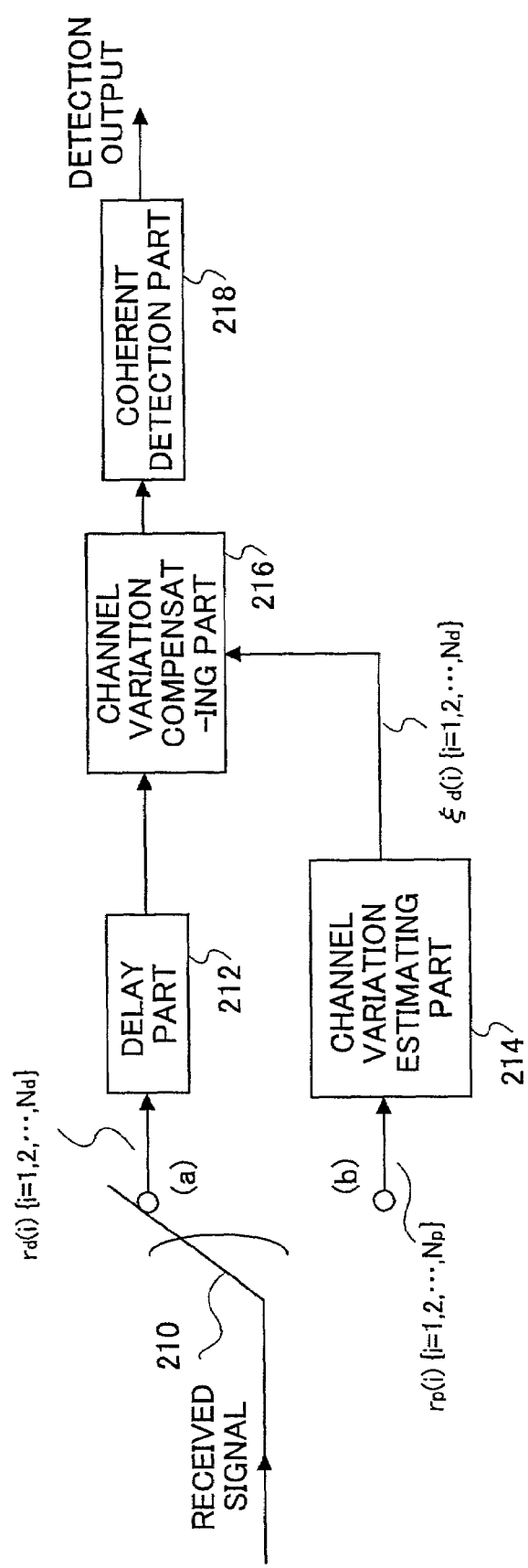
FIG. 11 is a block diagram showing a configuration of a first embodiment of a channel estimation part of the communication device of the first embodiment.

FIG. 11 is a block diagram showing a configuration of a first embodiment of a channel estimation part of the communication device of the first embodiment. The first embodiment of the channel estimation part adopts a first embodiment of a channel estimation method of the present invention and each of the second to eleventh embodiments of the channel estimation parts described later adopts second to eleventh embodiments of the channel estimation method of the present invention.

With the configuration shown in FIG. 11, when a communication is made between a base station and a mobile station using a packet wireless access system, channel variation experienced by a received packet signal is estimated, the channel variation is compensated and then detected.

In FIG. 11, the received packet signal is supplied to a delay part 212 or to a channel estimating part 214 via a switch 210. The channel variation estimating part 214 corresponds to the channel estimating parts A 20-1 to 20-3 and channel estimating parts 30-1 to 30-3 shown in FIG. 1. The switch 210 is switched between the terminal (a) side or to the terminal (b) side so as to separate a pilot symbol $r_p(i)$ and an information symbol $r_d(i)$ of the received packet signal. Note that the letter i of the pilot symbol $r_p(i)$ is a natural number, and may vary up to the number of symbols of a pilot symbol, $N_p$. Also, the letter i of the information symbol $r_d(i)$ is a natural number, and may vary up to the number of symbols of an information symbol, $N_d$.

The channel variation estimating part 214 implements channel estimation using the supplied pilot symbol $r_p(i)$ and supplies complex conjugate values $\xi_d(i)$ of the channel estimation value to the channel variation compensation part 216. Note that the letter i of the complex conjugate values $\xi_d(i)$ is a natural number, and may vary up to the number of symbols of a pilot symbol, $N_d$. On the other hand, the delay part 212 delays the supplied information symbol $r_d(i)$ and supplies an information symbol $r_d(i)$ to the channel variation compensation part 216.

The channel variation compensation part 216 compensates for the channel variation by multiplying the corresponding position of the supplied information symbol $r_d(i)$ by the complex conjugate values $\xi_d(i)$ and supplies the compensated information symbol $r'_d(i)$ to a coherent detection part 218. The coherent detection part 218 corresponds to the coherent detection part 141 shown in FIG. 1. The coherent detection part 218 implements absolute coherent detection of the information symbol $r'_d(i)$ and outputs the data decision result.

Figure 12:
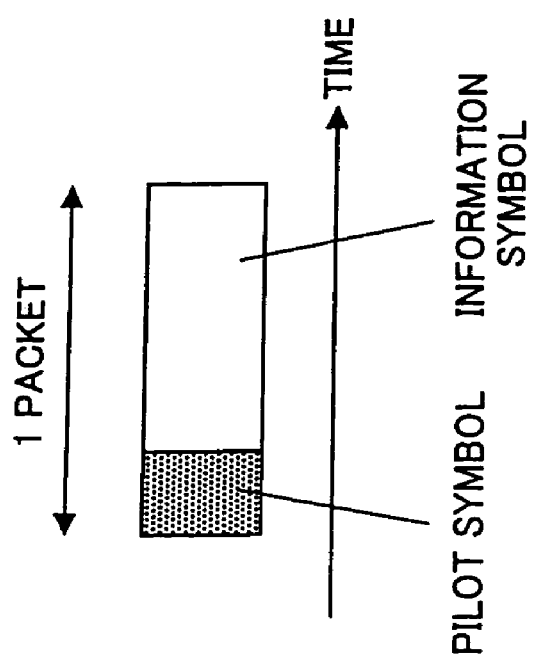
FIG. 12 is a diagram showing a structure of a packet wherein a pilot symbol is inserted.

FIG. 12 is a diagram showing a structure of a packet wherein pilot symbols are inserted. In FIG. 12, a packet includes a time multiplexed pilot symbols inserted therein. The pilot symbols may be inserted at any position, may be arranged in a temporally continuous manner, and may be arranged in a discrete manner. Also, any number of insertions of pilot symbols may be implemented.

When the packet shown in FIG. 12 is received, according to the configuration shown in FIG. 11, the received packet signal is temporally separated into the pilot symbols $r_p(i)$ and the information symbols $r_d(i)$ by switching the switch 210. The channel variation estimating part 214 estimates an amount of channel variation using the pilot symbols $r_p(i)$. The channel variation compensating part 216 compensates for the channel variation in accordance with the amount of channel variation. Accordingly, the coherent detection part 218 implements absolute coherent detection of the channel variation compensated information symbols $r'_d(i)$ and outputs the data decision result.

Figure 13:
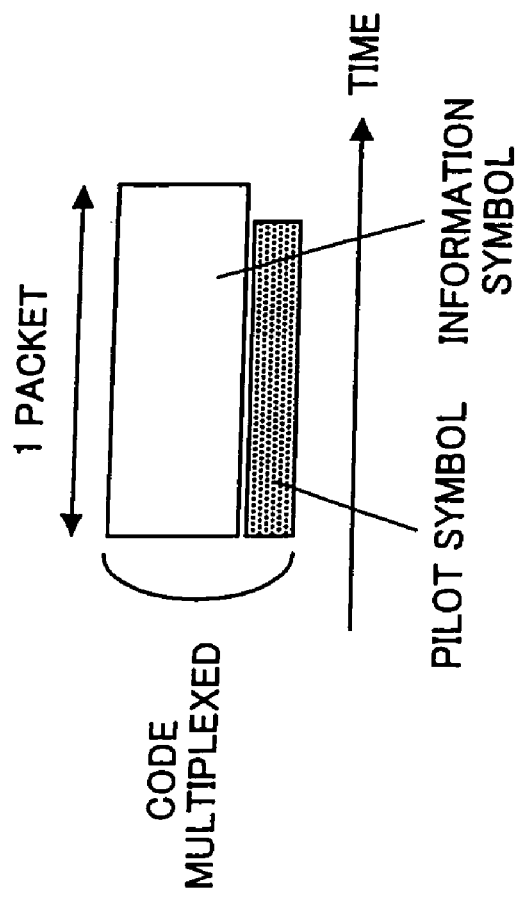
FIG. 13 is a diagram showing another structure of a packet wherein a pilot symbol is inserted.

FIG. 13 is a diagram showing another structure of a packet wherein pilot symbols are inserted. In FIG. 13, a packet includes code multiplexed pilot symbols inserted therein. The pilot symbols may be arranged in a temporally continuous manner and may be arranged in a discrete manner. Also, any number of insertions of pilot symbols may be implemented.

When the packet shown in FIG. 13 is received, according to the configuration shown in FIG. 11, the code-multiplexed pilot symbols are separated into the pilot symbols $r_p(i)$ and the information symbols $r_d(i)$ by a despreading process. The channel variation estimating part 214 estimates an amount of channel variation using the pilot symbols $r_p(i)$. The channel variation compensating part 216 compensates for the channel variation in accordance with the amount of channel variation. Accordingly, the coherent detection part 218 implements absolute coherent detection of the channel variation compensated information symbols $r'_d(i)$ and outputs the data decision result.

Figure 14:
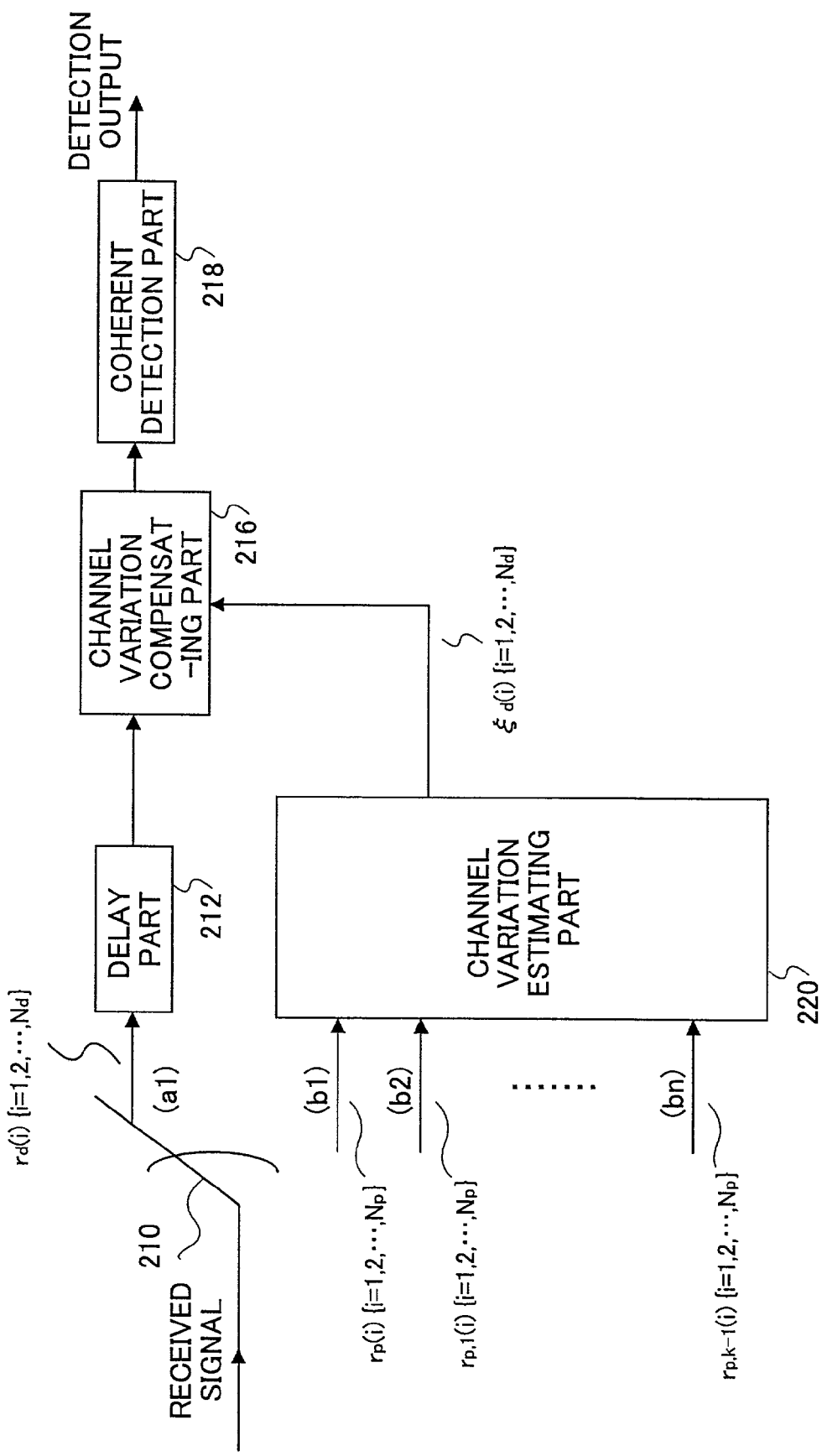
FIG. 14 is a block diagram showing a configuration of a second embodiment of a channel estimation part of the communication device of the first embodiment.

FIG. 14 is a block diagram showing a configuration of a second embodiment of a channel estimation part of the communication device of the first embodiment.

With the configuration shown in FIG. 14, when a communication is made between a base station and a mobile station using a packet wireless access system, channel variation experienced by a received packet signal is estimated, the channel variation is compensated and then detected. It is to be noted that the received packet in a packet in which time- or code-multiplexed pilot symbol is inserted in k-packets (k: natural number) transmitted from the same transmitter.

In FIG. 14, the received packet signal is supplied to the delay part 212 or to a channel estimating part 220 via the switch 210. The channel variation estimating part 220 corresponds to the channel estimating parts A 20-1 to 20-3 and channel estimating parts 30-1 to 30-3 shown in FIG. 1. The switch 210 is switched between the terminal (a) side or to the terminals (b1 to bn) side so as to separate pilot symbols $r_p(i)$, $r_{p,1}(i)$, $r_{p,k-1}(i)$ and information symbols $r_d(i)$ of the received packet signal. Note that the letter i of the pilot symbols $r_p(i)$, $r_{p,1}(i)$, $r_{p,k-1}(i)$ is a natural number, and may vary up to the number of symbols of a pilot symbol, $N_p$. Also, the letter i of the information symbol $r_d(i)$ is a natural number, and may vary up to the number of symbols of an information symbol, $N_d$.

The channel variation estimating part 214 implements channel estimation using the supplied pilot symbols $r_p(i)$, $r_{p,1}(i)$, $r_{p,k-1}(i)$ and supplies complex conjugate values $\xi_d(i)$ of the channel estimation value to the channel variation compensation part 216. Note that the letter i of the complex conjugate values $\xi_d(i)$ is a natural number, and may vary up to the number of symbols of a pilot symbol, $N_d$. On the other hand, the delay part 212 delays the supplied information symbol $r_d(i)$ and supplies the information symbol $r_d(i)$ to the channel variation compensation part 216.

The channel variation compensation part 216 compensates for the channel variation by multiplying the corresponding position of the supplied information symbol $r_d(i)$ by the complex conjugate values $\xi_d(i)$ and supplies the compensated information symbols $r'_d(i)$ to the coherent detection part 218. The coherent detection part 218 implements absolute coherent detection of the information symbols $r'_d(i)$ and outputs the data decision result.

Figure 15:
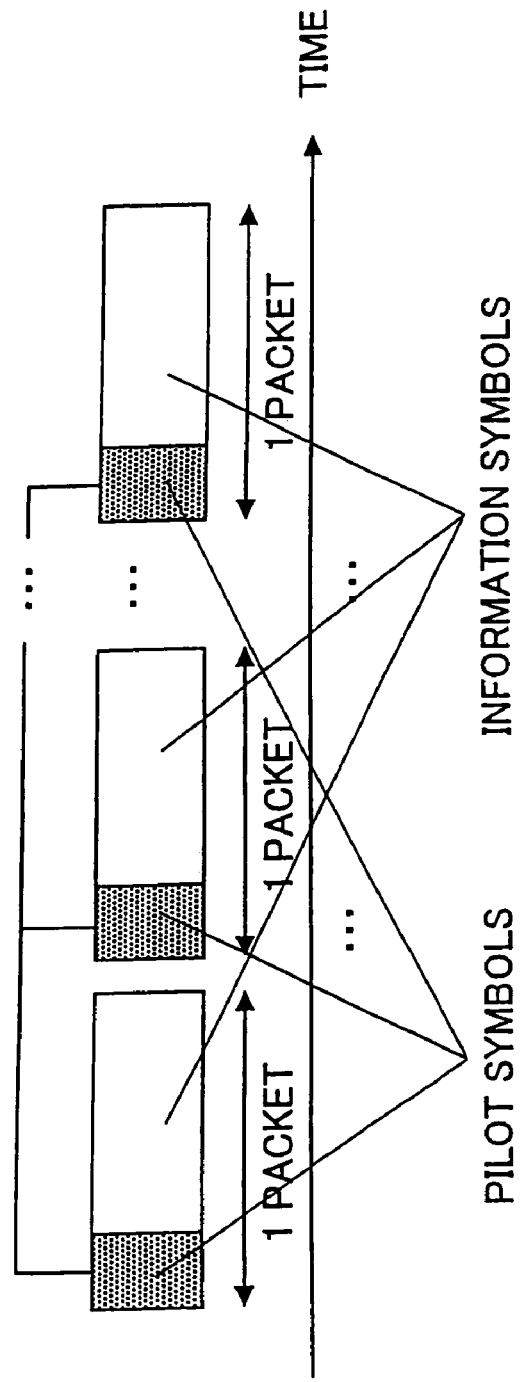
FIG. 15 is a diagram showing still another structure of packets wherein pilot symbols are inserted.
Figure 16:
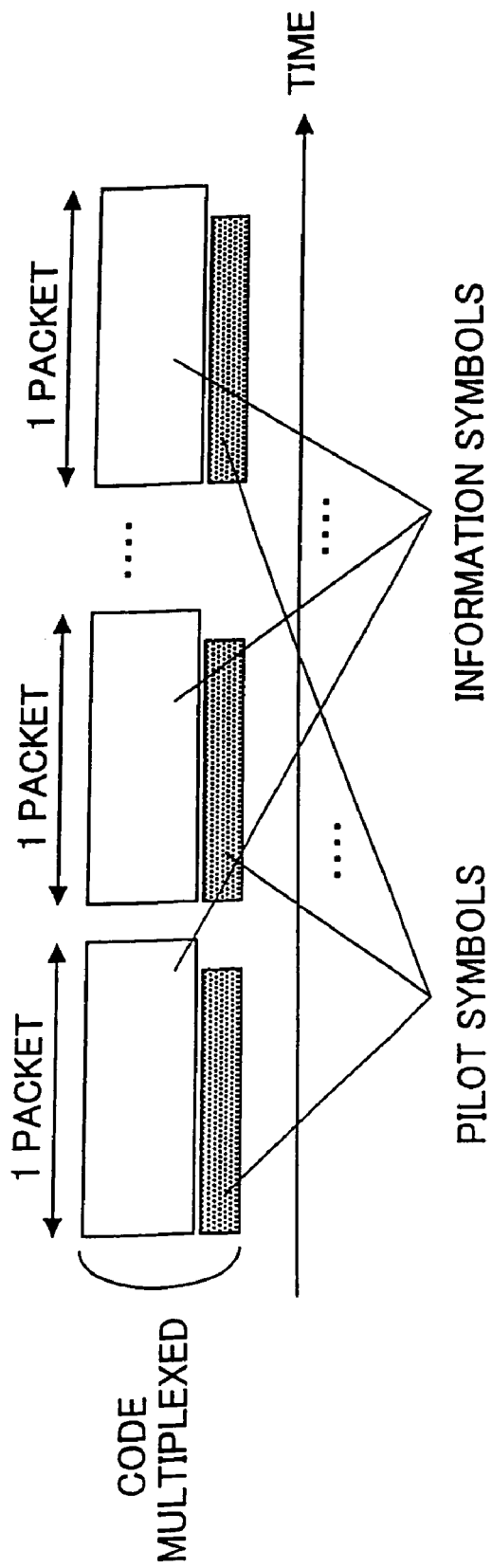
FIG. 16 is a diagram showing yet another structure of packets wherein pilot symbols are inserted.

FIGS. 15 and 16 are diagrams showing other structures of the present embodiment of a packet wherein pilot symbols are inserted. In FIGS. 15 and 16, time- or code-multiplexed pilot symbols are inserted in k-packets (k: natural number) transmitted from the same transmitter. In this case, pilot symbols included in each packet are extracted and the extracted pilot symbols are combined so as to implement channel estimation.

FIG. 15 shows a structure similar to the packet of FIG. 12 in which the pilot symbols are time-multiplexed. Also, FIG. 16 shows a structure similar to the packet of FIG. 13 in which the pilot symbols are code-multiplexed.

When the packets shown in FIG. 15 are received, according to the configuration shown in FIG. 14, the packets are temporally separated into the pilot symbols $r_p(i)$, $r_{p,1}(i)$, $r_{p,k-1}(i)$ and the information symbols $r_d(i)$ by switching the switch 210. The channel variation estimating part 220 estimates an amount of channel variation using the pilot symbols $r_p(i)$, $r_{p,1}(i)$, $r_{p,k-1}(i)$. The channel variation compensating part 216 compensates for the channel variation in accordance with the amount of channel variation. Accordingly, the coherent detection part 218 implements absolute coherent detection of the channel variation compensated information symbols $r'_d(i)$ and outputs the data decision result.

When the packet shown in FIG. 16 is received, the code-multiplexed pilot symbols are separated into the pilot symbols $r_p(i)$, $r_{p,1}(i)$, $r_{p,k-1}(i)$ and the information symbols $r_d(i)$ by a despreading process. The channel variation estimating part 210 estimates an amount of channel variation using the pilot symbols $r_p(i)$, $r_{p,1}(i)$, $r_{p,k-1}(i)$. The channel variation compensating part 216 compensates for the channel variation in accordance with the amount of channel variation. Accordingly, the coherent detection part 218 implements absolute coherent detection of the channel variation compensated information symbols $r'_d(i)$ and outputs the data decision result.

Figure 17:
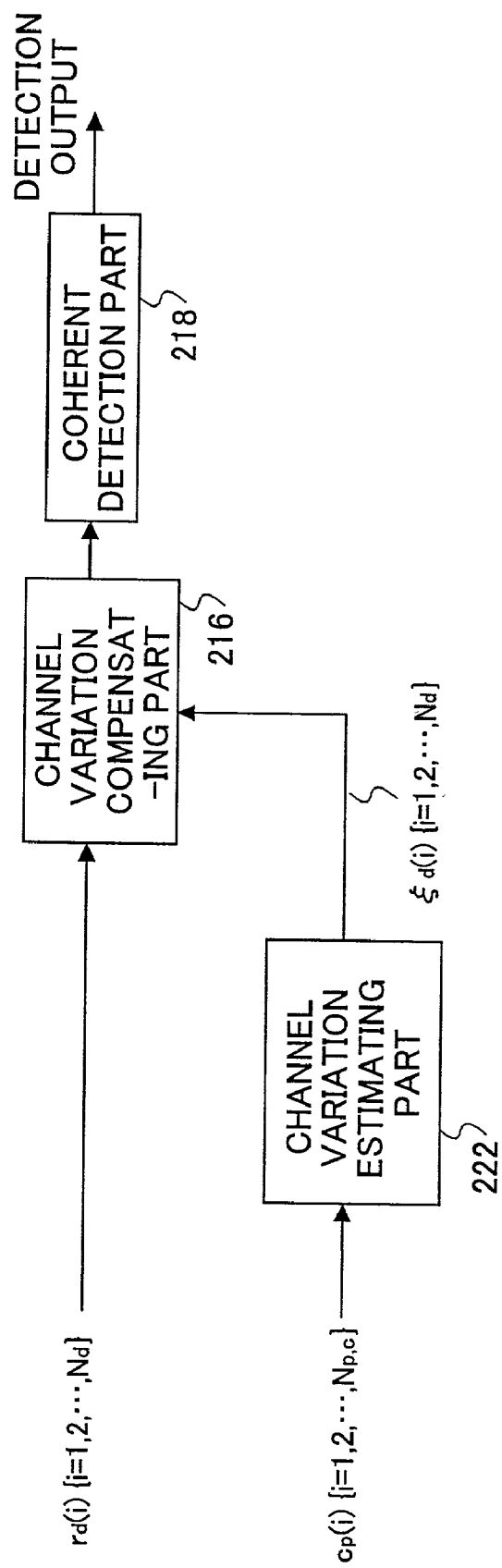
FIG. 17 is a block diagram showing a configuration of a third embodiment of a channel estimation part of the communication device of the first embodiment.

FIG. 17 is a block diagram showing a configuration of a third embodiment of a channel estimation part of the communication device of the first embodiment.

With the configuration shown in FIG. 17, when a communication is made between a base station and a mobile station using a packet wireless access system, channel variation experienced by a received packet signal is estimated using pilot symbols applied in the common control channel, the channel variation is compensated and then detected.

A mobile communication system is generally provided with a common control channel for announcing various control signals from a base station to mobile stations. Therefore, packets with pilot symbols multiplexed therewith may be transmitted from the base station to the mobile stations via the common control channel.

In FIG. 17, the received packet signal transmitted from a base station to a mobile station is separated into pilot symbols $c_p(i)$ and information symbols $r_d(i)$ multiplexed in the common control channel at the mobile station, and supplied to the channel variation compensating part 216 or the channel variation estimating part 222. The channel variation estimating part 222 corresponds to the channel estimating parts A 20-1 to 20-3 and the channel estimating parts B 30-1 to 30-3 shown in FIG. 1. Note that the letter i of a pilot symbol $c_p(i)$ is a natural number, and may vary up to the number of symbols of a pilot symbol, $N_{p,c}$. Also, the letter i of an information symbol $r_d(i)$ is a natural number, and may vary up to the number of symbols of an information symbol, $N_d$.

The channel variation estimating part 222 implements channel estimation using the supplied pilot symbols $c_p(i)$ and supplies complex conjugate values $\xi_d(i)$ of the channel estimation value to the channel variation compensation part 216. Note that the letter i of the complex conjugate values $\xi_d(i)$ is a natural number, and may vary up to the number of symbols of an pilot symbol, $N_p$.

The channel variation compensation part 216 compensates for the channel variation by multiplying the corresponding position of the supplied information symbols $r_d(i)$ by the complex conjugate values $\xi_d(i)$ and supplies the compensated information symbols $r'_d(i)$ to a coherent detection part 218. The coherent detection part 218 implements absolute coherent detection of the supplied information symbols $r'_d(i)$ and outputs the data decision result.

Figure 18:
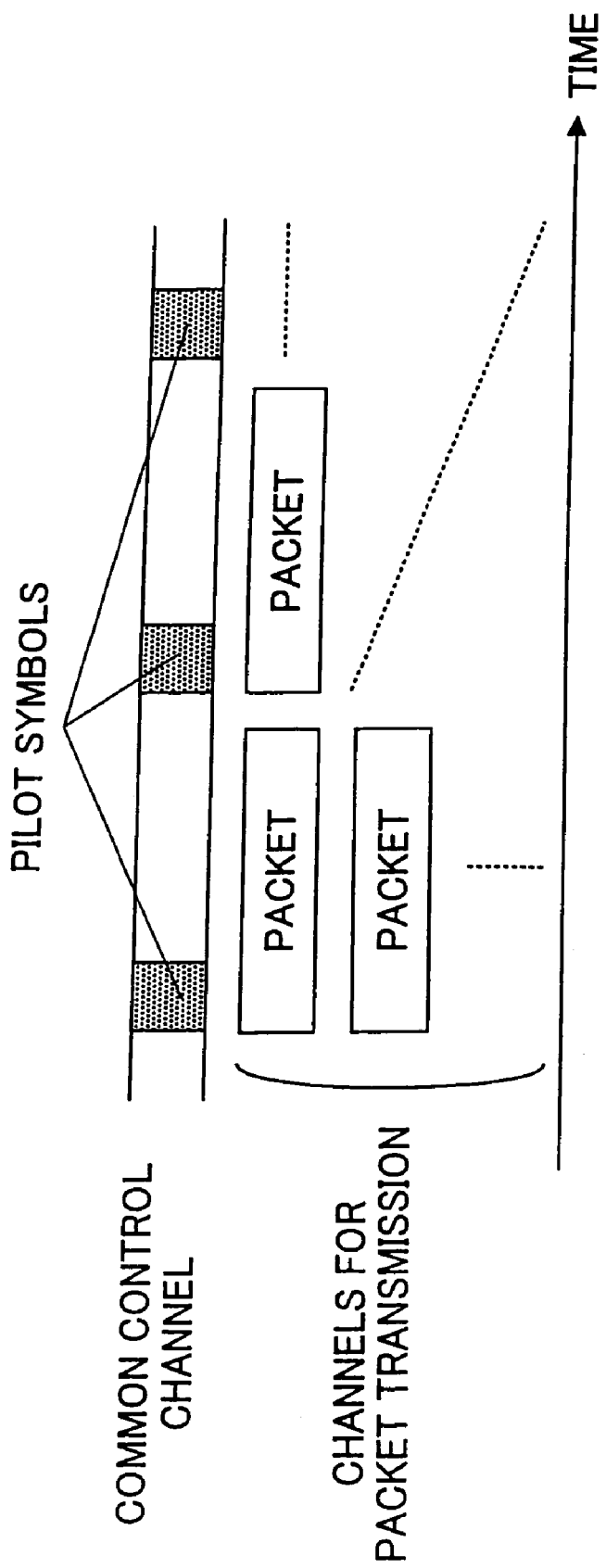
FIG. 18 is a diagram showing a further structure of packets wherein pilot symbols are inserted.
Figure 19:
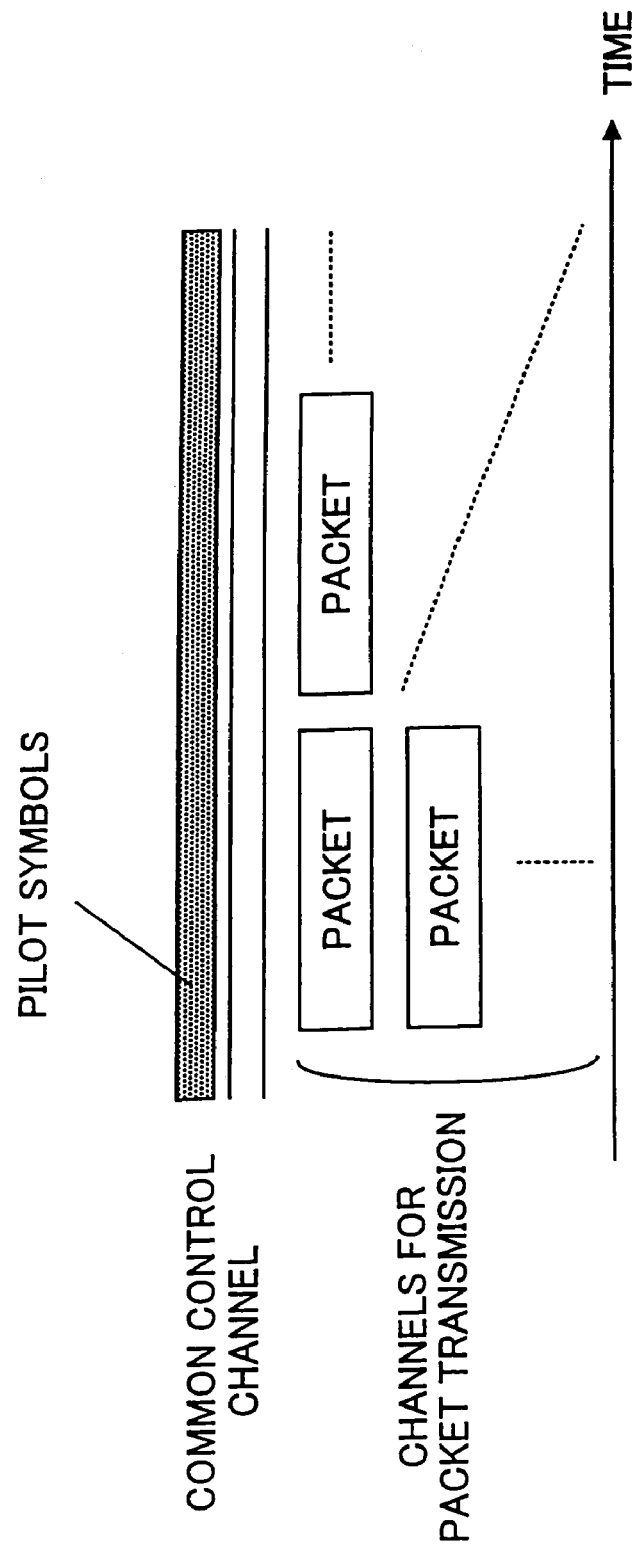
FIG. 19 is a diagram showing a further structure of a packet wherein pilot symbols are inserted.

FIGS. 18 and 19 are diagrams showing other structures of the present embodiment of a packet wherein pilot symbols are inserted. In FIGS. 18 and 19, time- or code-multiplexed pilot symbols are inserted in the common control channel of the packets transmitted from the base station to the mobile station. In this case, pilot symbols included in the common control channel of each packet are extracted and the extracted pilot symbols are combined so as to implement channel estimation.

FIG. 18 shows a structure similar to the packet of FIG. 12 in which the pilot symbols are time-multiplexed in the common control channel. Also, FIG. 19 shows a structure similar to the packet of FIG. 13 in which the pilot symbols are code-multiplexed in the common control channel.

When the packets shown in FIG. 18 are received, according to the configuration shown in FIG. 17, the packets are temporally separated into the pilot symbols $c_p(i)$ and the information symbols $r_d(i)$. The channel variation estimating part 222 estimates an amount of channel variation using the pilot symbols $r_p(i)$. The channel variation compensating part 216 compensates for the channel variation in accordance with the amount of channel variation. Accordingly, the coherent detection part 218 implements absolute coherent detection of the channel variation compensated information symbols $r'_d(i)$ and outputs the data decision result.

When the packet shown in FIG. 19 is received, the code-multiplexed pilot symbols are separated into the pilot symbols $c_p(i)$ and the information symbols $r_d(i)$ by a despreading process. The channel variation estimating part 222 estimates an amount of channel variation using the pilot symbols $c_p(i)$. The channel variation compensating part 216 compensates for the channel variation in accordance with the amount of channel variation. Accordingly, the coherent detection part 218 implements absolute coherent detection of the channel variation compensated information symbols $r'_d(i)$ and outputs the data decision result.

Figure 20:
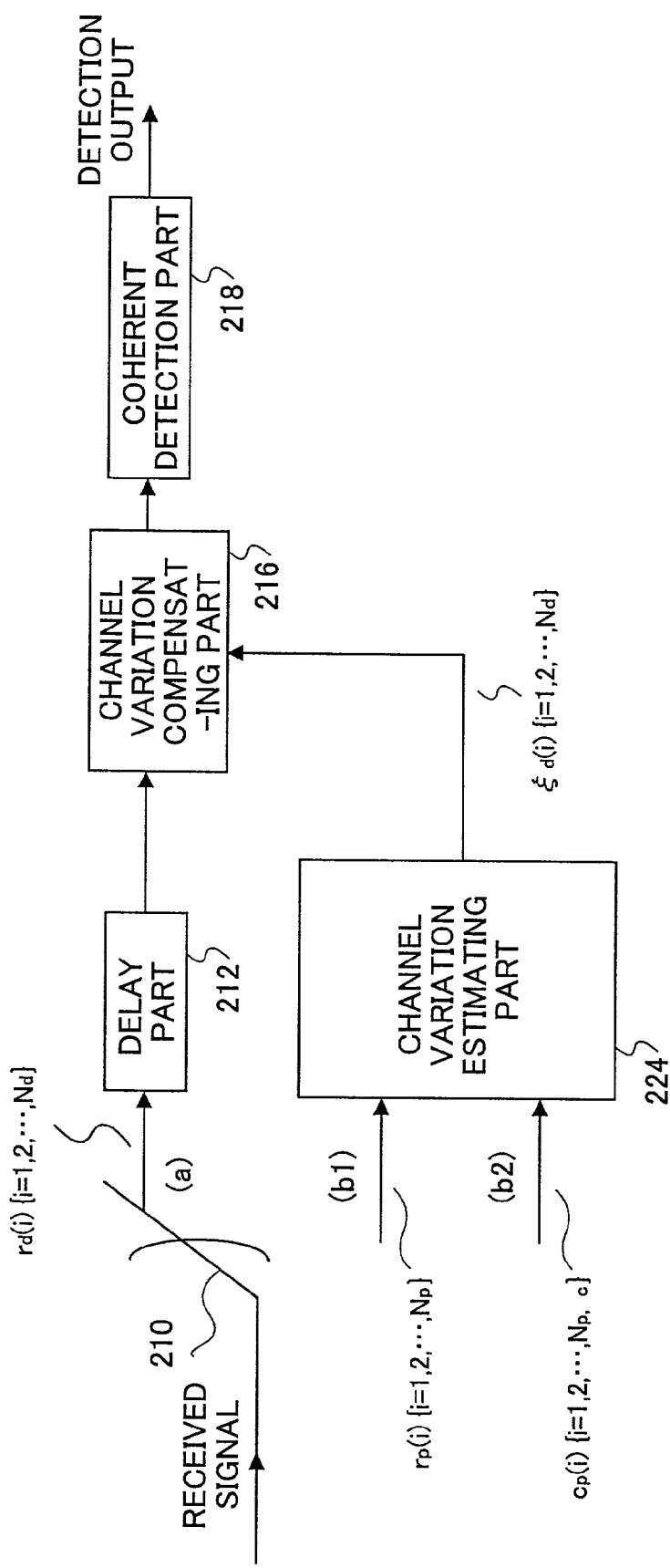
FIG. 20 is a block diagram showing a configuration of a fourth embodiment of a channel estimation part of the communication device of the first embodiment.

FIG. 20 is a block diagram showing a configuration of a fourth embodiment of a channel estimation part of the communication device of the first embodiment.

With the configuration shown in FIG. 20, when a communication is made between a base station and a mobile station using a packet wireless access system, channel variation experienced by a received packet signal is estimated using pilot symbols applied in the common control channel, the channel variation is compensated and then detected.

In FIG. 20, the received signal including the received packet signal and the common control channel are supplied to a delay part 212 or to a channel estimating part 224 via the switch 210. The channel variation estimating part 224 corresponds to the channel estimating parts A 20-1 to 20-3 and channel estimating parts 30-1 to 30-3 shown in FIG. 1. The switch 210 is switched between the terminal (a) side or to the terminals (b1 and b2) side so as to separate pilot symbols $r_p(i)$, information symbols $r_d(i)$ and pilot symbols $c_p(i)$ multiplexed with the common control channel of the received packet signal.

The channel variation estimating part 224 implements channel estimation using the supplied pilot symbols $r_p(i)$ and $c_p(i)$ and supplies complex conjugate values $\xi_d(i)$ of the channel estimation value to the channel variation compensation part 216. Note that the letter i of the complex conjugate values $\xi_d(i)$ is a natural number, and may vary up to the number of symbols of a pilot symbol, $N_p$. On the other hand, the delay part 212 delays the supplied information symbols $r_d(i)$ and supplies the information symbols $r_d(i)$ to the channel variation compensation part 216.

The channel variation compensation part 216 compensates for the channel variation by multiplying the corresponding position of the supplied information symbol $r_d(i)$ by the complex conjugate values $\xi_d(i)$ and supplies the compensated information symbol $r'_d(i)$ to the coherent detection part 218. The coherent detection part 218 corresponds to the coherent detection part 141 shown in FIG. 1. The coherent detection part 218 implements absolute coherent detection of the information symbol $r'_d(i)$ and outputs the data decision result.

Figure 21:
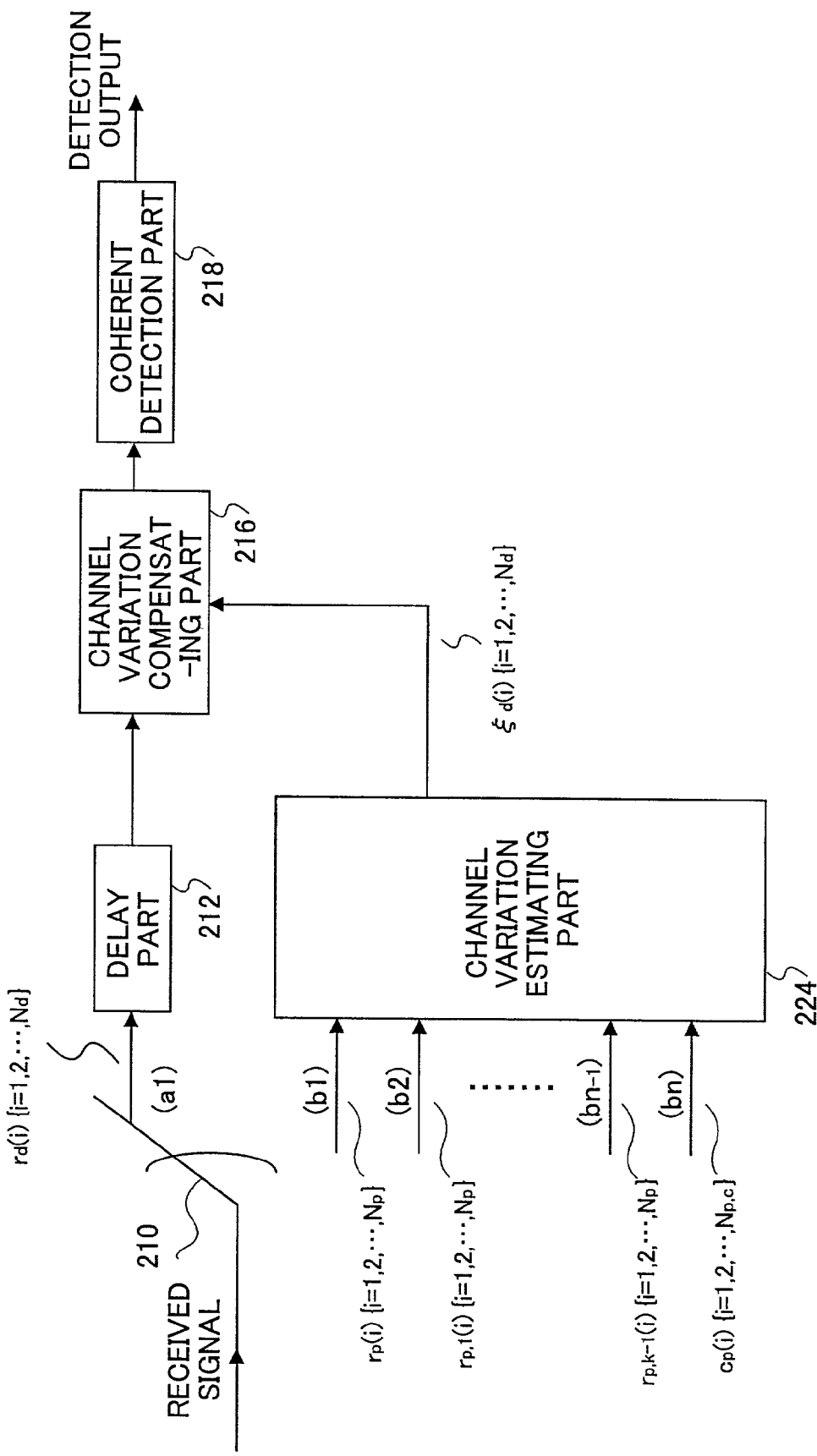
FIG. 21 is a block diagram showing a configuration of a fifth embodiment of a channel estimation part of the communication device of the first embodiment.

FIG. 21 is a block diagram showing a configuration of a fifth embodiment of a channel estimation part of the communication device of the first embodiment.

With the configuration shown in FIG. 21, when a communication is made between a base station and a mobile station using a packet wireless access system, channel variation experienced by a received packet signal is estimated using pilot symbols applied in the common control channel and pilot symbols of the received packet, the channel variation is compensated and then detected. It is to be noted that the time- or code-multiplexed pilot symbols are inserted in k-packets (k: natural number) transmitted from the same transmitter.

In FIG. 21, the received signal including the received packet signal and the common control channel are supplied to the delay part 212 or to a channel estimating part 224 via the switch 210. The channel variation estimating part 224 corresponds to the channel estimating parts A 20-1 to 20-3 and channel estimating parts 30-1 to 30-3 shown in FIG. 1. The switch 210 is switched between the terminal (a1) side or to the terminals (b1 to bn) side so as to separate pilot symbols $r_p(i)$, $r_{p,1}(i)$, $r_{p,k-1}(i)$, information symbols $r_d(i)$ and the pilot symbols multiplexed with the common control channel, $c_p(i)$ of the received packet signal.

The channel variation estimating part 224 implements channel estimation using the supplied pilot symbols $r_p(i)$, $r_{p,1}(i)$, $r_{p,k-1}(i)$ and $c_p(i)$ and supplies complex conjugate values $\xi_d(i)$ of the channel estimation value to channel variation compensation part 216. Note that the letter I of the complex conjugate values $\xi_d(i)$ is a natural number, and may vary up to the number of symbols of a pilot symbol, $N_d$. On the other hand, the delay part 212 delays the supplied information symbols $r_d(i)$ and supplies the information symbols $r_d(i)$ to the channel variation compensation part 216.

The channel variation compensation part 216 compensates for the channel variation by multiplying the corresponding position of the supplied information symbols $r_d(i)$ by the complex conjugate values $\xi_d(i)$ and supplies the compensated information symbols $r'_d(i)$ to the coherent detection part 218. The coherent detection part 218 implements absolute coherent detection of the information symbols $r'_d(i)$ and outputs the data decision result.

Figure 22:
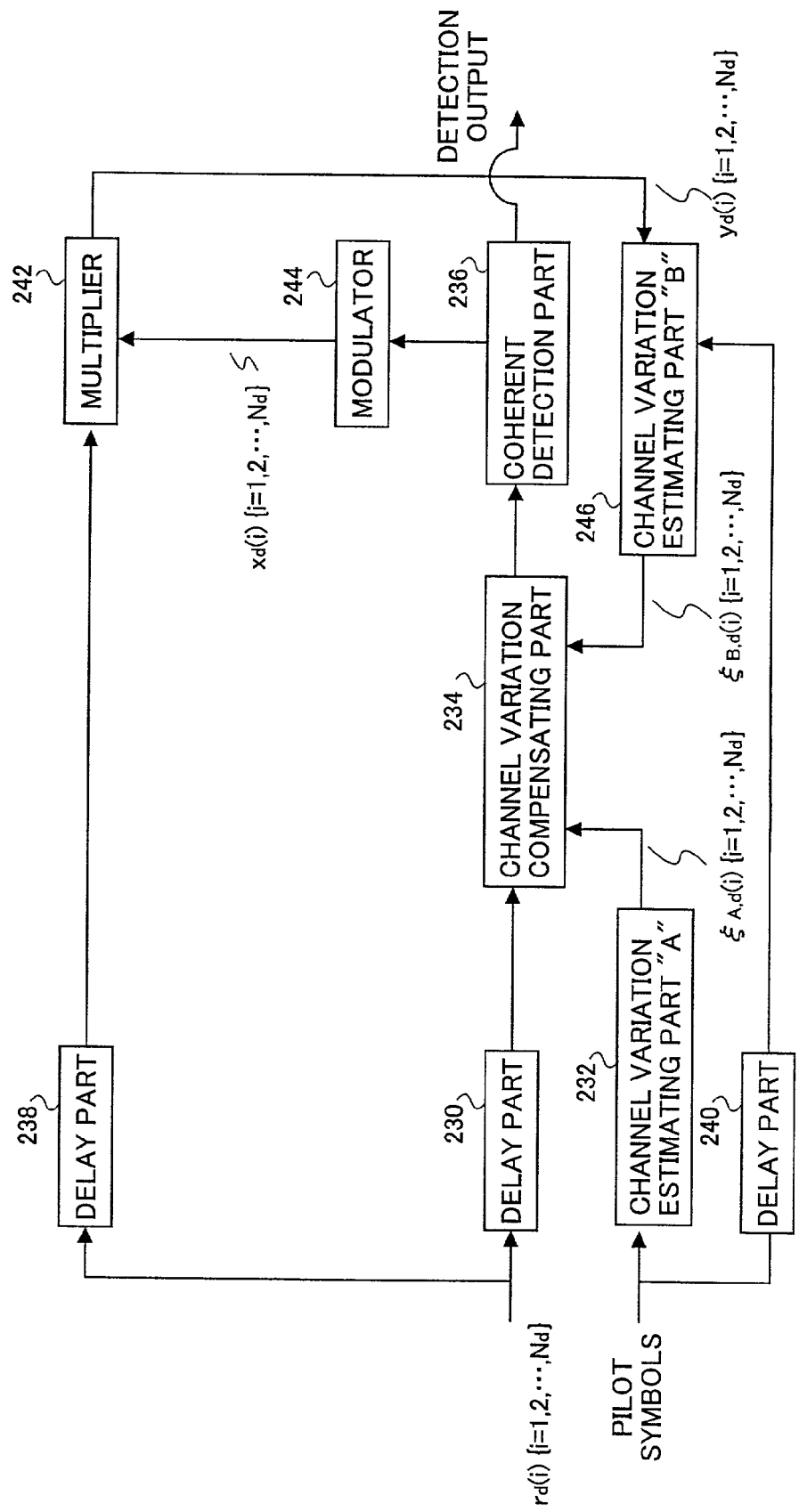
FIG. 22 is a block diagram showing a configuration of a sixth embodiment of a channel estimation part of the communication device of the first embodiment.

FIG. 22 is a block diagram showing a configuration of a sixth embodiment of a channel estimation part of the communication device of the first embodiment.

With the configuration shown in FIG. 22, when a communication is made between a base station and a mobile station using a packet wireless access system, a process of estimating channel variation experienced by a received packet signal, compensating and detecting the channel variation is repeatedly implemented through a feedback loop.

In FIG. 22, the received packet signal is separated into pilot symbols $r_p(i)$ and information symbols $r_d(i)$ and the information symbols $r_d(i)$ are supplied to the delay parts 230 and 238 and the pilot symbol $r_p(i)$ are supplied to the channel variation estimating part A 232 and the delay part 240. The channel variation estimating part A 232 and the channel variation estimating part B 246 correspond to the channel estimating parts A 20-1 to 20-3 and the channel estimating parts B 30-1 to 30-3, respectively.

The channel variation estimating part A 232 implements channel estimation using the supplied pilot symbol $r_p(i)$ and supplies complex conjugate values $\xi_{A,d}(i)$ of the channel estimation value to a channel variation compensation part 234. Note that the letter i of the complex conjugate values $\xi_d(i)$ is a natural number, and may vary up to the number of symbols of a pilot symbol, $N_p$. Also, methods similar to those of various embodiments of the channel estimating part described above may be used as a channel estimating method using a pilot symbol.

On the other hand, the delay part 230 delays the supplied information symbols $r_d(i)$ and supplies the information symbols $r_d(i)$ to the channel variation compensation part 234. The channel variation compensation part 234 compensates for the channel variation by multiplying the corresponding position of the supplied information symbols $r_d(i)$ by the complex conjugate values $\xi_{A,d}(i)$ and supplies the compensated information symbols $r'_d(i)$ to a coherent detection part 236. The coherent detection part 236 implements absolute coherent detection of the supplied information symbols $r'_d(i)$ and outputs the data decision result.

The coherent detection part 236 supplies the tentative data decision information symbol to the modulator 244. The modulator 244 modulates the supplied information symbol $r_d(i)$ again and supplies the complex conjugate values $x_d(i)$ of the sequence to the multiplier 242. On the other hand, the delay part 238 delays the supplied information symbols $r_d(i)$ and supplies the information symbols $r_d(i)$ to the multiplier 242.

The multiplier 242 multiplies the corresponding position of the supplied information symbol $r_d(i)$ by complex conjugate values $x_d(i)$ of the sequence, so as to generate an information symbol sequence $y_d(i)$ wherefrom the modulation components are removed. The multiplier 242 supplies the generated information symbol sequence $y_d(i)$ to the channel variation estimating part B 246. Also, the delay part 240 delays the supplied pilot symbol $r_p(i)$ and supplies its information symbol $r_p(i)$ to the channel variation compensation part B 246.

The channel variation estimation part B 246 implements channel estimation again using the supplied pilot symbol $r_p(i)$ and the information symbol sequence $y_d(i)$ wherefrom the modulation components are removed. Complex conjugate values $\xi_{B,d}(i)$ of the thus-derived channel estimation values are supplied to the channel variation compensating part 234 again.

The channel variation compensating part 234 compensates for the channel variation by multiplying the corresponding position of the supplied information symbol $r_d(i)$ by the complex conjugate values $\xi_{B,d}(i)$ and supplies the compensated information symbol $r'_d(i)$ to a coherent detection part 236. The coherent detection part 236 implements absolute coherent detection of the supplied information symbol $r'_d(i)$ and outputs the data decision result.

The data decision information symbol may be directly output as a detection output or may be fed back to the channel variation estimating part B 246 via the modulator 244 and the multiplier 242 again so as to repeat the process sequence for n-cycles (n: natural number).

Figure 23:
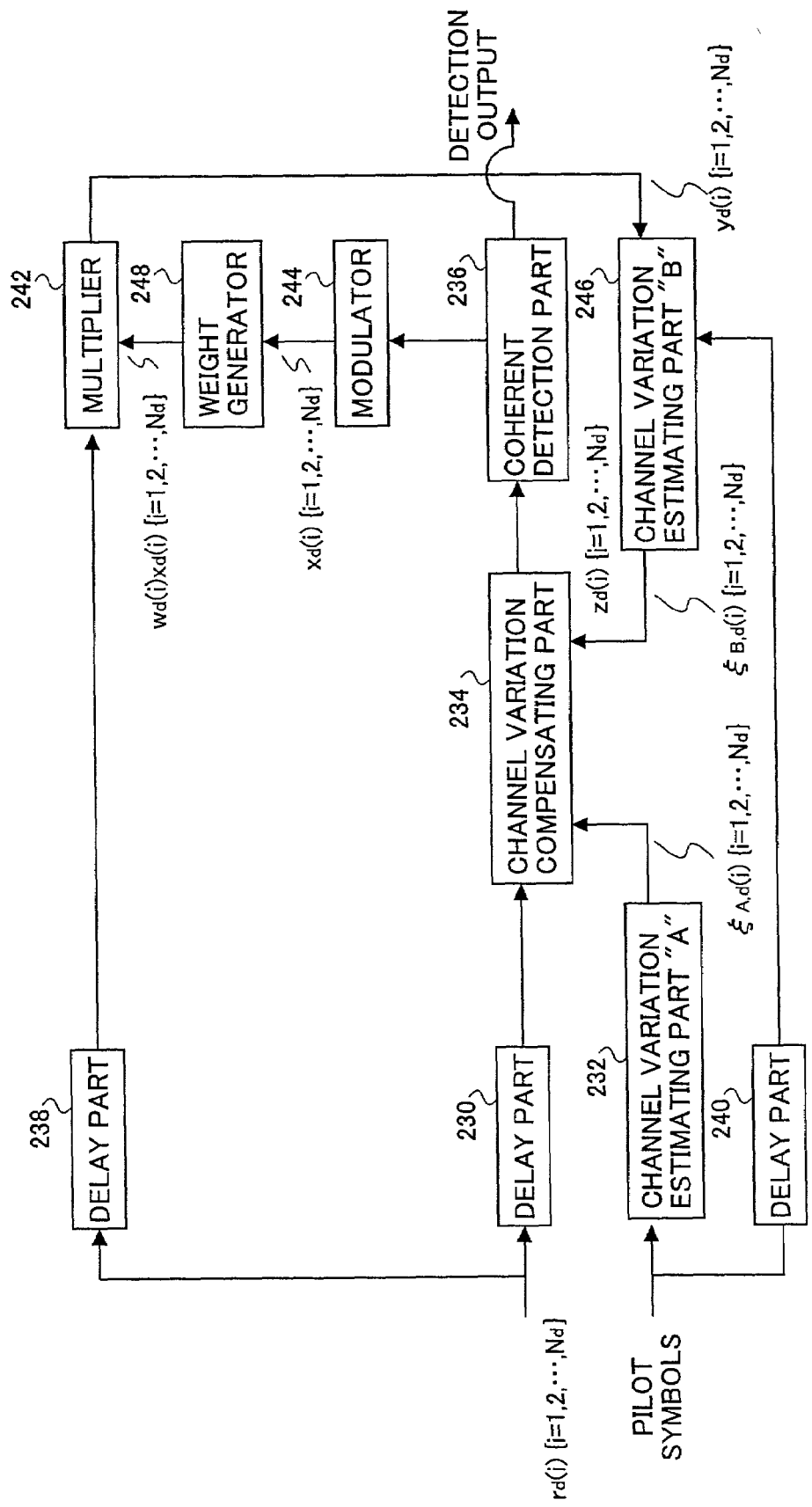
FIG. 23 is a block diagram showing a configuration of a seventh embodiment of a channel estimation part of the communication device of the first embodiment.

FIG. 23 is a block diagram showing a configuration of a seventh embodiment of a channel estimation part of the communication device of the first embodiment. In FIG. 23, elements similar to those shown in FIG. 22 are indicated with corresponding reference numerals.

The configuration shown in FIG. 23 is characterized in that a weight generator 248 is provided between the modulator 244 and the multiplier 242. The multiplier 244 remodulates the supplied information symbol and supplies complex conjugate values $x_d(i)$ of the sequence to the weight generator 248. The weight generator 248 implements weighting on the supplied complex conjugate values $x_d(i)$.

For example, the weight generator 248 outputs a weighting value $w_d(i)$ in accordance with the condition when the information symbol is received. As an example of the weighting value $w_d(i)$ to be outputted, it is possible to use a value proportional to a value of the received signal power of the received symbol derived by squaring a value of the channel variation compensated received symbol sequence $x_d(i)$.

A value proportional to the desired signal power versus interference power ratio for each received symbol may also be used as the weighting values $w_d(i)$. In order to derive the desired signal power versus interference power ratio, for example, using reception power of the information symbol as the desired signal power, a calculation is performed to derive a squared value of a difference between the channel variation compensated received symbol $z_d(i)$ and a squared value of its channel estimation value, and then an average value taken over $N_d$ symbols is used as an interference signal.

Further, by controlling the weighting controller 248, it is possible to control an amount of the complex conjugate values $x_d(i)$ to be fed back. For example, the information symbol having a weighting values of "0" will not be fed back. It is to be noted that other processes are similar to the processes of FIG. 22, and therefore will not be explained in detail.

Figure 24:
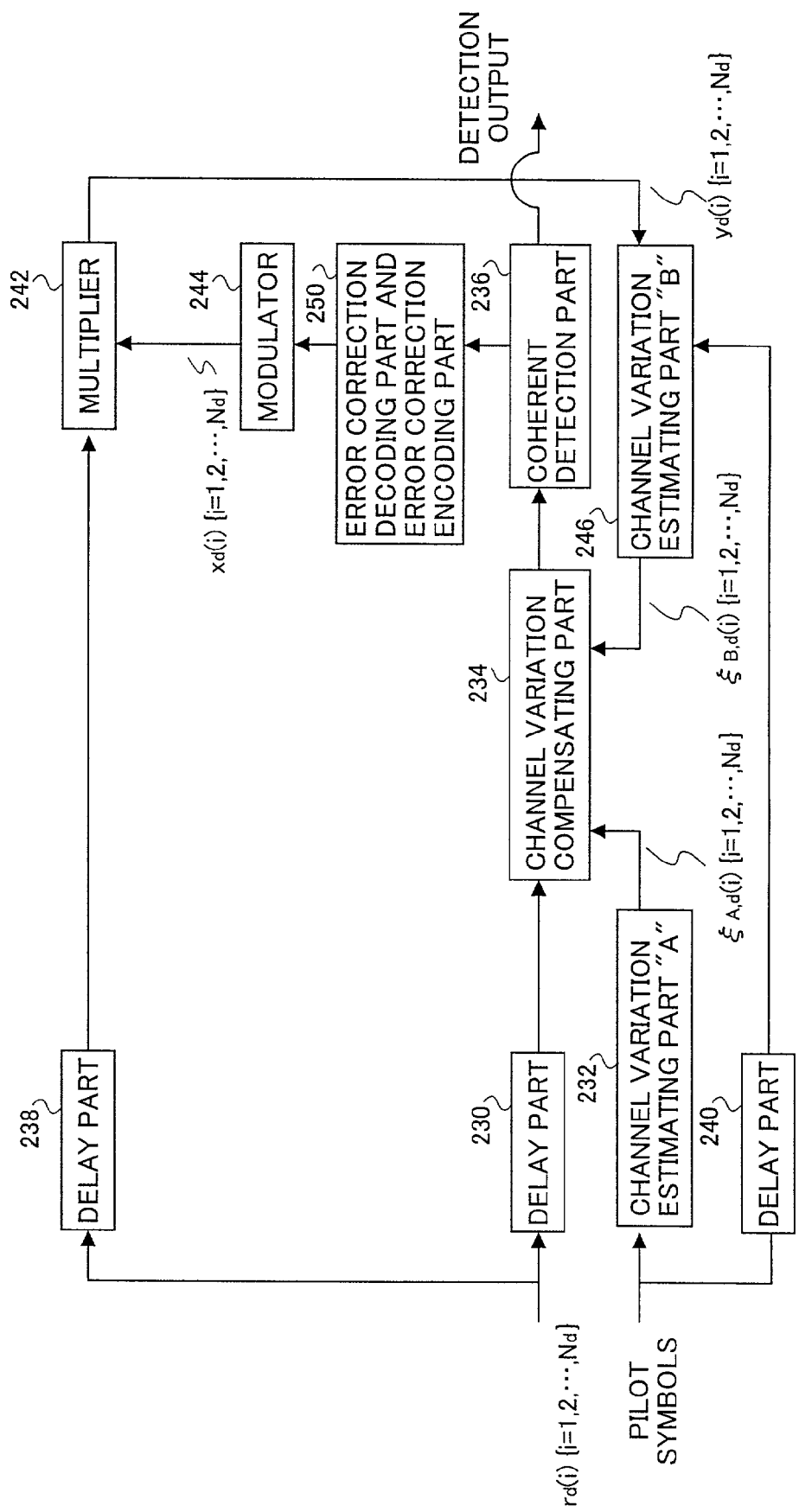
FIG. 24 is a block diagram showing a configuration of an eighth embodiment of a channel estimation part of the communication device of the first embodiment.

FIG. 24 is a block diagram showing a configuration of an eighth embodiment of a channel estimation part of the communication device of the first embodiment. In FIG. 24, elements similar to those shown in FIG. 22 are indicated with corresponding reference numerals and will not be explained in detail.

The configuration of FIG. 24 is characterized in that an error correction decoder and error correction encoder 250 is provided between the coherent detection part 236 and the modulator 244. The error correction decoder and error correction encoder 250 corresponds to the error correction decoder 143-1 and the error correction encoder 143-2 shown in FIG. 1. The coherent detection part 236 implements absolute coherent detection of the supplied information symbol $r'_d(i)$ and implements tentative data decision of the information symbol.

The coherent detection part 236 supplies the tentative data decision information symbol to the error correction decoder and error correction encoder 250. When the supplied information symbol is error correction coded, the error correction decoder and error correction encoder 250 implements error correction decoding and then error correction encoding is implemented again. The modulator 244 modulates the error correction coded information symbol again and supplies the conjugate values $x_d(i)$ of the sequence to the multiplier 242. The modulator 244 corresponds to the remodulating part 143 shown in FIG. 1. Other process will not be described here.

Figure 25:
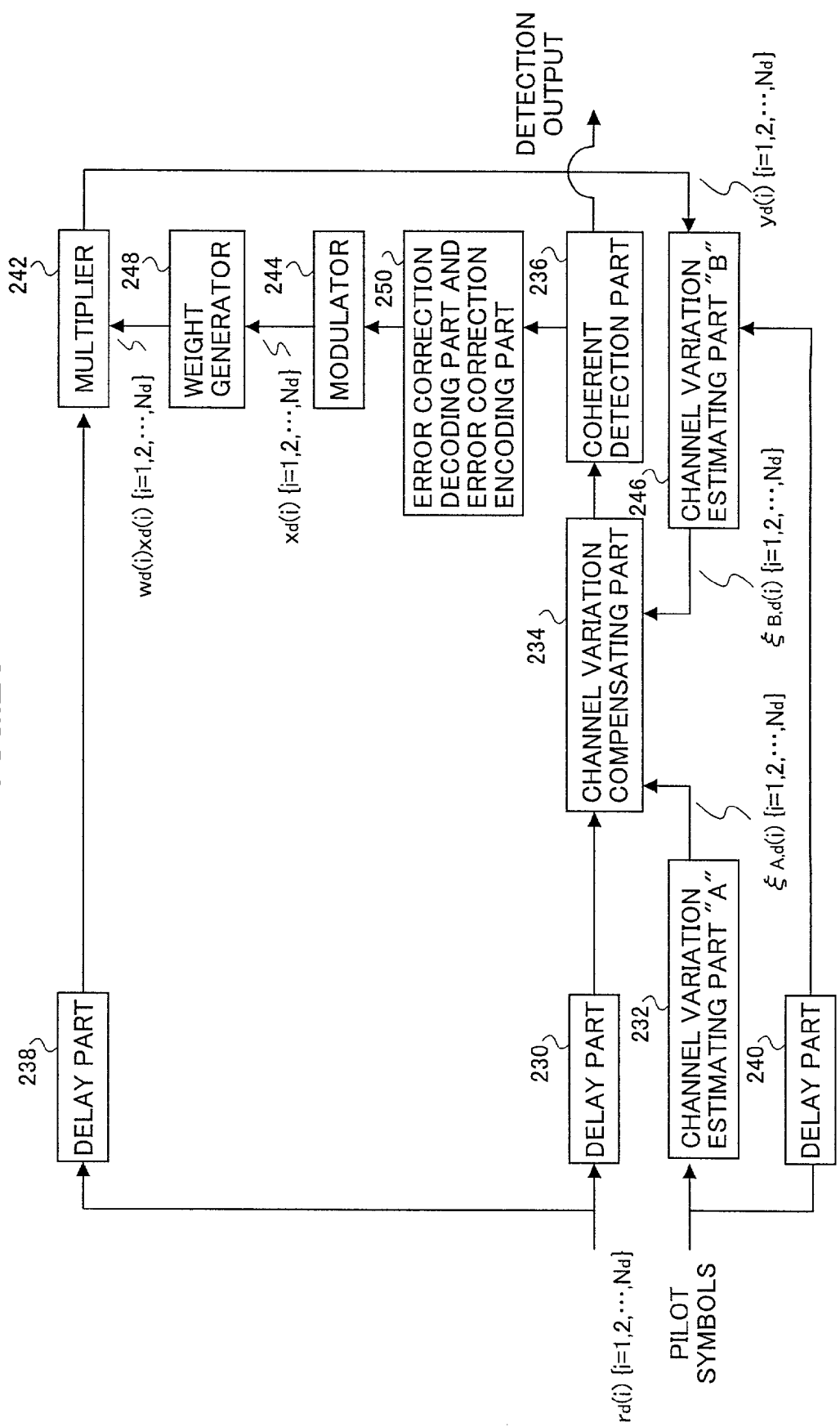
FIG. 25 is a block diagram showing a configuration of a ninth embodiment of a channel estimation part of the communication device of the first embodiment.

FIG. 25 is a block diagram showing a configuration of a ninth embodiment of a channel estimation part of the communication device of the first embodiment. In FIG. 25, elements similar to those shown in FIGS. 23 and 24 are indicated with corresponding reference numerals and will not be explained in detail.

The configuration of FIG. 25 is characterized in that the error correction decoder and error correction encoder 250 is provided between the coherent detection part 236 and the modulator 244 and the weighting generator 248 is provided between the modulator 244 and the multiplier 242. The weighting generator 248 may use the weighting method explained with reference to FIG. 23 or may use the reliability of the received symbol obtained while decoding the error correction code. As the reliability information, if it is a convolutional code, a value of a path metric calculated in a procedure of Viterbi decoding may be used. Also, an operation of the weighting generator 248 and the error correction decoder and error correction encoder 250 used in the configuration of FIG. 22 will not be explained here, since an explanation has been made with reference to FIGS. 23 and 24.

Also, as has been described above, a feedback path of the information symbol to the channel variation estimation part B 246 of FIGS. 23 to 25 and a feedback path of the information symbol to the path search parts B 130 of FIGS. 8 to 10 may be shared using a configuration such as that shown in FIG. 1.

Referring now to FIGS. 26 to 29, the channel estimation part will be described for a case where a multicarrier transmission system is adopted.

Figure 26:
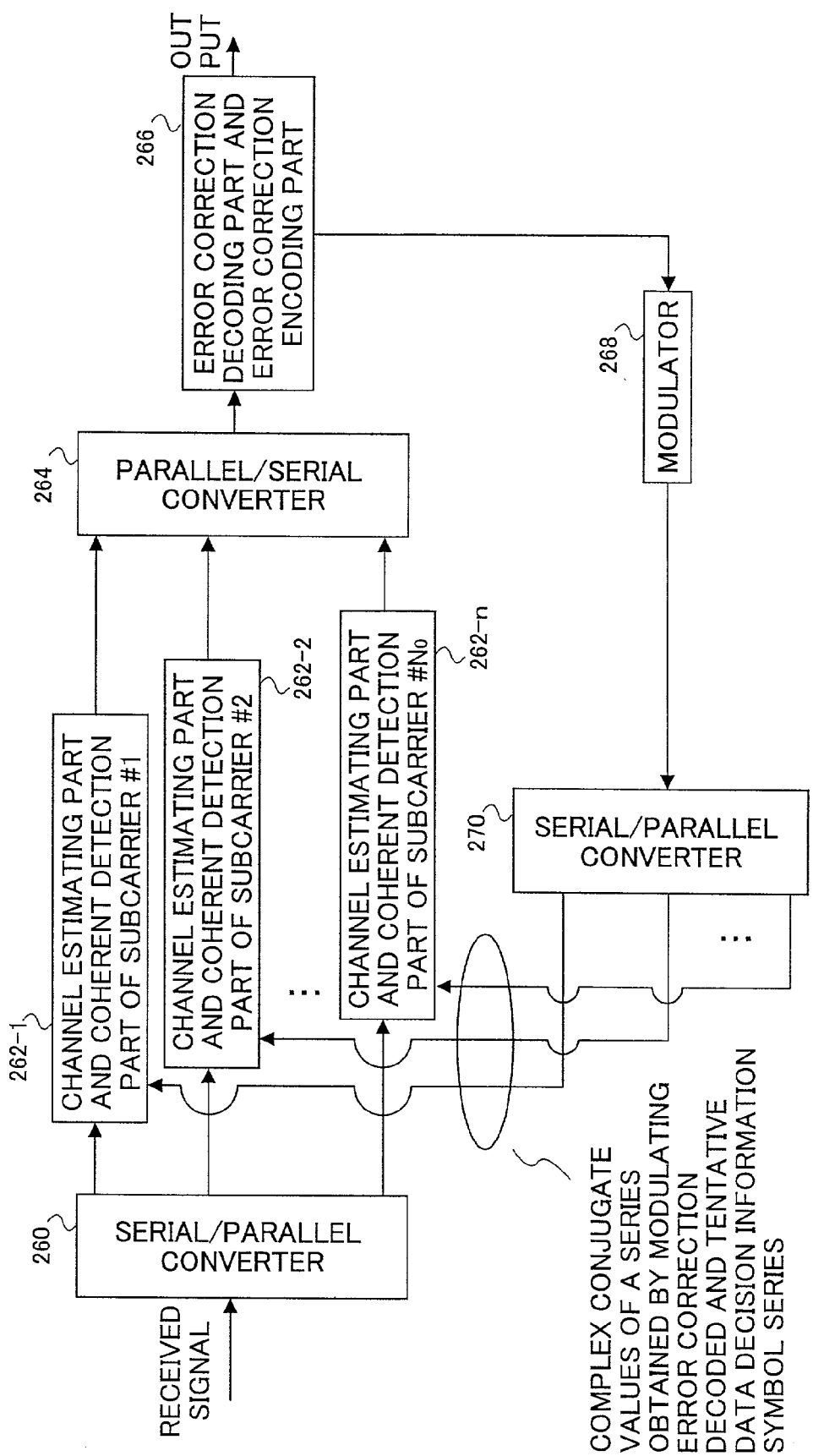
FIG. 26 is a block diagram showing a configuration of a tenth embodiment of a channel estimation part of the communication device of the first embodiment.

FIG. 26 is a block diagram showing a configuration of a tenth embodiment of a channel estimation part of the communication device of the first embodiment. The configuration of FIG. 26 is a configuration where the eighth embodiment of the channel estimation part is applied particularly in a case where communication is made between a base station and a mobile station using a multicarrier transmission system transmitting information using a plurality of subcarriers.

In order to implement coherent detection in a multicarrier transmission system, it is necessary to implement channel estimation for each subcarrier. Accordingly, the received packet signal is supplied to a serial-to-parallel converter 260, resolved into components of respective subcarriers and serial-to-parallel converted. Therefore, the serial-to-parallel converter 260 resolves the supplied received packet signal into sequence for each subcarrier and supplies them to the channel estimating part and coherent detection parts 262-1 to 262-n of the subcarriers.

Figure 27:
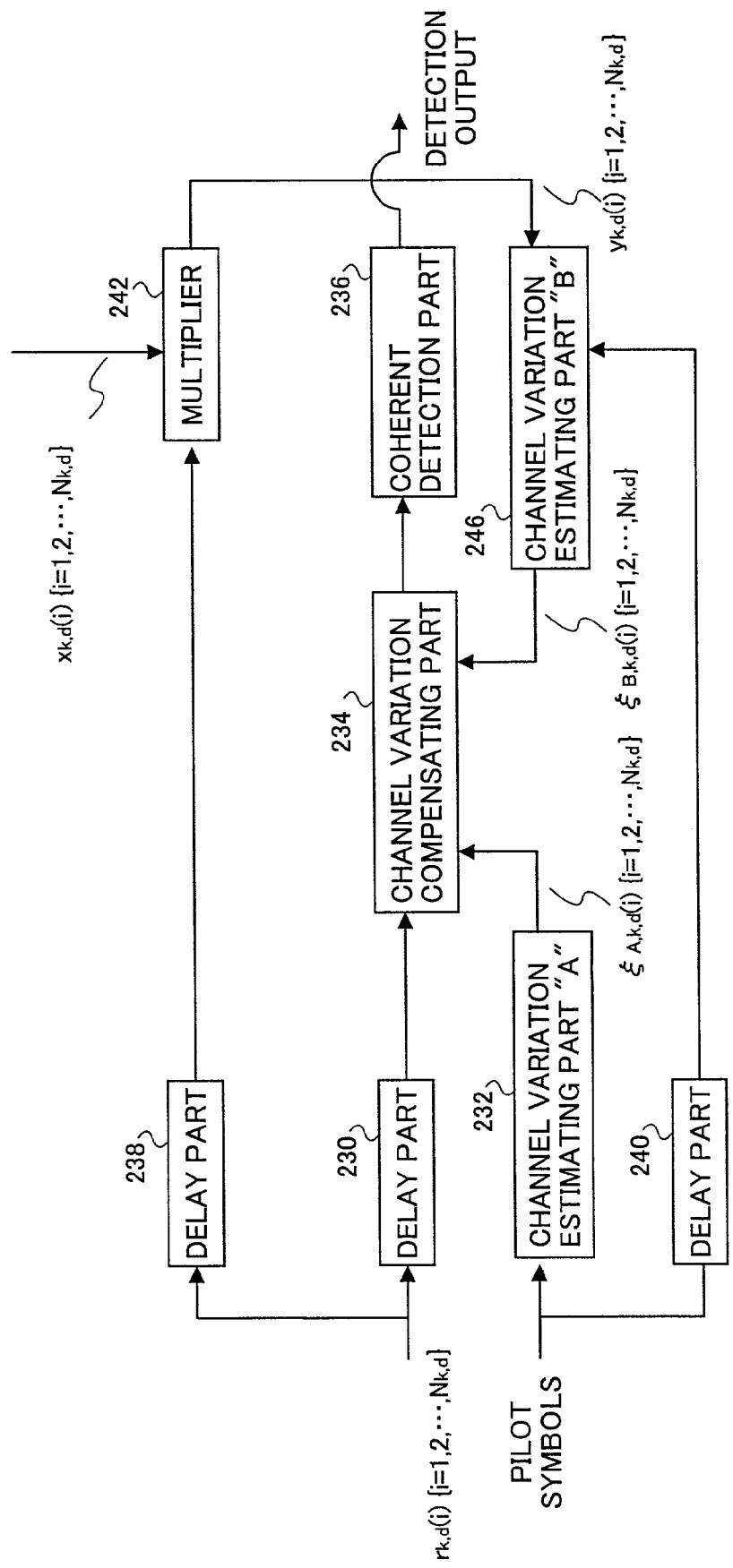
FIG. 27 is a block diagram showing a configuration of a channel estimation part implemented for each of the sub-carrier sequence in the tenth embodiment of the channel estimation part.

Channel estimation may be applied to each sequence of the subcarrier in accordance with the configuration shown in FIG. 27. FIG. 27 is a block diagram showing a configuration of a channel estimation part implemented for each of the subcarrier sequence in the tenth embodiment of the channel estimation part. In FIG. 27, elements similar to those shown in FIG. 22 are indicated with corresponding reference numerals and will not be explained in detail.

Firstly, the channel variation estimating part A 232 implements channel estimation using pilot symbols. The channel estimation method using the pilot symbols may be a method adopted in either one of the first to fifth embodiments of the channel estimating part described above. Next, the channel variation compensation part 234 compensates for the channel variation by multiplying the complex conjugate values $\xi_{A,k,d}(i)$ of the derived channel estimation value by the corresponding information symbols $r_{k,d}(i)$, the coherent detection and tentative data decision is implemented on the information symbols. The tentative data decision information symbols are supplied to a parallel-to-serial converter 264 of FIG. 26.

The parallel-to-serial converter 264 converts the supplied plurality of sequences of subcarriers in to a single sequence by parallel-to-serial conversion, and supplies the obtained single sequence to an error correction decoder and error correction encoder 266. The error correction decoder and error correction encoder 266 performs error correction decoding on the supplied single sequence and outputs the obtained sequence to the modulator 268.

At the modulator 268, the supplied single sequence is error correction coded again, modulated, and supplied to a serial-to-parallel converter 270. The serial-to-parallel converter 270 performs serial-to-parallel conversion on the supplied single sequence of complex conjugate values $\xi_{k,d}(i)$, separates the supplied single sequence into respective sequences of the subcarriers and feeds back to the channel estimating part and coherent detection parts 262-1 to 262-n of the subcarriers.

The multipliers 242 of the channel estimating part and coherent detection parts 262-1 to 262-n of the subcarriers multiply the received symbol by the fed back complex conjugate values $x_{k,d}(i)$, so as to generate information symbols $y_{k,d}(i)$ wherefrom the modulation components are removed.

The channel variation estimation part B 246 is supplied with the information symbols $y_{k,d}(i)$ wherefrom the modulation components are removed and the pilot symbols, and implements channel estimation again. The channel variation estimation part B 246 supplies the complex conjugate values $\xi_{B,k,d}(i)$ of the thus-derived channel estimation values to the channel variation compensating part 234. The channel variation compensating part 234 compensates for the channel variation by multiplying the information symbol $r_{k,d}(i)$ by the complex conjugate values $\xi_{B,k,d}(i)$ and the data decision result is obtained by implementing absolute coherent detection at the coherent detection part 236.

The data decision information symbol may be directly outputted as a detection output or may be fed back to the channel variation estimating part B 246 so as to repeat the channel estimation and absolute coherent detection process sequence for n-cycles (n: natural number).

FIG. 28 is a block diagram showing a configuration of an eleventh embodiment of a channel estimation part of the communication device of the first embodiment. In FIG. 28, elements similar to those shown in FIG. 26 are indicated with corresponding reference numerals and will not be explained in detail. The configuration of FIG. 28 is a configuration where the ninth embodiment of the channel estimation part is applied particularly in a case where communication is made between a base station and a mobile station using a multicarrier transmission system transmitting information using a plurality of subcarriers.

In order to implement coherent detection in a multicarrier transmission system, it is necessary to implement channel estimation for each subcarrier. Accordingly, the received packet signal is supplied to a serial-to-parallel converter 260, separated into components of respective subcarriers and serial-to-parallel converted. Therefore, the serial-to-parallel converter 260 separates the supplied received packet signal into sequence for each subcarrier and supplies them to the channel estimating part and coherent detection parts 262-1 to 262-n of the subcarriers.

Channel estimation may be applied to each sequence of subcarrier in accordance with the configuration shown in FIG. 29. FIG. 29 is a block diagram showing a configuration of a channel estimation part implemented for each of the subcarrier sequence in the tenth embodiment of the channel estimation part. In FIG. 29, elements similar to those shown in FIG. 27 are indicated with corresponding reference numerals and will not be explained in detail.

Firstly, the channel variation estimating par A 232 implements channel estimation using pilot symbols. The channel estimation method using the pilot symbols may be a method adopted in either one of the first to fifth embodiments of the channel estimating part described above. Next, the channel variation compensation is implemented by multiplying the complex conjugate values $\xi_{A,k,d}(i)$, of the derived channel estimation value by the corresponding information symbol $r_{k,d}(i)$, an absolute coherent detection is performed and the information symbols are tentative data decision. The tentative data decision information symbols are supplied to a parallel-to-serial converter 264 of FIG. 28.

The parallel-to-serial converter 264 converts the supplied plurality of sequences of subcarriers into a single sequence by parallel-to-serial conversion, and supplies the obtained single sequence to the error correction decoder and error correction encoder 266. The error correction decoder and error correction encoder 266 performs error correction decoding on the supplied single sequence and outputs the obtained sequence to the modulator 268.

At the modulator 268, the supplied single sequence is error correction coded again, modulated, and supplied to a weight generator 272. The weight generator 272 may be of a configuration in which the weighting processes adopted in the seventh to ninth embodiments of the channel estimation part is implemented. The weight generator 272 supplies the weighted single sequence of complex conjugate values $x_{k,d}(i)$ to the serial-to-parallel converter 270. The serial-to-parallel converter 270 performs serial-to-parallel conversion on the supplied single sequence of complex conjugate values $w_{k,d}(i) x_{k,d}(i)$, separates the supplied single sequence into respective sequences of the subcarriers and feeds back to the channel estimating part and coherent detection parts 262-1 to 262-n of the subcarriers.

The multipliers 242 of the channel estimating part and coherent detection parts 262-1 to 262-n of the subcarriers multiply the received symbol by the fed back complex conjugate values $w_{k,d}(i) x_{k,d}(i)$, so as to generate an information symbol sequence $y_{k,d}(i)$ wherefrom the modulation components are removed.

The channel variation estimation part B 246 is supplied with the information symbol sequence $y_d(i)$ wherefrom the modulation components are removed and the pilot symbols, and implements channel estimation again. The channel variation estimation part B 246 supplies the complex conjugate values $\xi_{B,k,d}(i)$ of the thus-derived channel estimation values to the channel variation compensating part 234. The channel variation compensating part 234 compensates for the channel variation by multiplying the information symbol $r_{k,d}(i)$ by the complex conjugate values $\xi_{B,k,d}(i)$ and the data decision result is obtained by implementing absolute coherent detection at the coherent detection part 236.

The data decision information symbol may be directly output or may be fed back to the channel variation estimating part B 246 so as to repeat the channel estimation and absolute coherent detection process sequence for n-cycles (n: natural number).

As has been described above, according to each embodiment of the channel estimating part, since pilot symbols of a known phase is used for channel estimation, a high-accuracy channel estimation is possible irrespective of the continuity of the transmission signals. Also, the pilot symbol of known phase may be transmitted by being time-multiplexed or code-multiplexed on the transmission packet. Further, by using the above-described channel estimation method for a communication device, it is possible to realize a communication device capable of implementing a high-accuracy channel estimation.

In the first embodiment of the communication device, it can be easily understood that any combination of any one of the embodiments of the path search part and any one of the embodiments of the channel estimating part may be used, or, either any one of the embodiments of path search part or any one of the embodiments of the channel estimating part may be used.

Also, it can be easily seen that the use of a pilot symbol described with reference to FIGS. 11 to 21 is not limited to channel estimation but may is also applicable to path search. In other words, although a method of multiplexing the pilot symbol has been described with reference to FIGS. 12, 13, 15, 16, 18 and 19, the pilot symbol multiplexed with the received signal with such multiplexing methods may also be used for path search methods described with reference to FIGS. 3 to 10. Therefore, the pilot symbols inputted to the channel variation estimating parts 214, 220, 222, 224, 226 described with reference to FIGS. 11, 14, 17, 20, and 21 may be used for path search as well as for channel estimation.

Next, a second embodiment of the communication device of the present invention will be described. In the second embodiment of the communication device, one of the methods for using the pilot symbol described with reference to FIGS. 11 to 21 is either adopted in the path search part or in both channel estimating part and the path search part.

The second embodiment of the communication device also may also provide an effect similar to the first embodiment of the above-described communication device.

Further, the present invention is not limited to these embodiments, and variations and modifications may be made without departing from the scope of the present invention.

The invention claimed is:

1. A path search method for detecting timings of path components included in a signal received via a multipath propagation path, said method comprising:
   a first path search step detecting the timings of the path components using pilot symbols of a known phase included in said signal received via the multipath propagation path; and
   a second path search step detecting the timings of the path components using information symbols that are derived from a signal demodulated according to said timings detected in the first path search step and said pilot symbols of the known phase.

2. The path search method as claimed in claim 1, wherein said information symbols derived from the signal demodulated according to the timings detected in the first path search step are generated by:
   despreading said signal received via the multipath propagation path according to said timings detected in the first path search step;
   cophasing and summing the information symbols despreaded according to said respective path timings in a symbol by symbol manner;
   demodulating and implementing data decision of said cophased and summed respective information symbols; and
   remodulating said data decision signal.

3. The path search method as claimed in claim 2, wherein information symbols satisfying a predetermined condition, of said information symbols derived from the signal demodulated according to the timings detected in the first path search step, are selected and fed back.

4. The path search method as claimed in claim 1, wherein said second path search step is repeated until a predetermined condition is satisfied.

5. The path search method as claimed in claim 1 wherein said signal received via the multipath propagation path is transmitted in accordance with a multicarrier code division multiplex system.

6. A channel estimation method for estimating channel variation using pilot symbols by detecting timings of path components included in a signal received via a multipath propagation path, said method comprising:
   a first path search step detecting the timings of the path components using pilot symbols of a known phase in said signal received via the multipath propagation path;

a first channel estimation step estimating the channel variation using the pilot symbols of the known phase, after said first path search step;

a second path search step detecting the timings of the path components using the timings detected in said first path search step, information symbols that are derived from a signal demodulated according to said first channel estimation step, and the pilot symbols of the known phase; and a second channel estimation step estimating the channel variation using the information symbols that are derived from the signal demodulated according to said first channel estimation step, and the pilot symbols of the known phase, according to the timings detected in said second path search step.

7. The channel estimation method as claimed in claim 6, wherein said first and second channel estimation steps implement channel estimation by combining said pilot symbols of the known phase and pilot symbols included in other packets transmitted from the same transmission source.

8. The channel estimation method estimation method as claimed in claim 6, wherein said second channel estimation step includes:

compensating for the channel variation in accordance with a result of a first channel estimation of said first channel estimation step and generating tentative data decision information symbols from the compensated information symbols; and generating information symbols devoid of modulation components said tentative data decision information symbols and implementing a second channel estimation of said second channel estimation step using said pilot symbols and information symbols.

9. The channel estimation method as claimed in claim 8, wherein said generating the tentative data decision information symbol includes a weighting process for weighting said tentative data decision information symbols according to a reliability.

10. The channel estimation method as claimed in claim 8, wherein said generating the tentative data decision information symbol includes an error correction process for error correction decoding said tentative data decision information symbols implementing an error correction encoding again.

11. The channel estimation method as claimed in claim 8, wherein said generating the tentative data decision information symbol includes a weighting process for weighting said tentative data decision information symbols after the error correction encoding according to a reliability.

12. The channel estimation method as claimed in claim 6, wherein said first channel estimation step includes:

acquiring the pilot symbols of the known phase included in a received packet; and implementing a first channel estimation using the acquired pilot symbols.

13. A communication device for implementing a path search that detects timings of path components included in a signal received via a multipath propagation path, said device comprising:

a first path search part configured to detect the timings of the path components using pilot symbols of a known phase included in said signal received via the multipath propagation path; and a second path search part configured to detect the timings of the path components using information symbols that are derived from a signal demodulated according to said timings detected in the first path search part and said pilot symbols of the known phase.

14. The communication device as claimed in claim 13, further comprising:

a first channel estimation part configured to estimate a channel variation after a first path search by said first path search part; and a second channel estimation part configured to estimate a channel variation using information symbols derived from a signal demodulated according to said timings detected in the first channel estimation part and said pilot symbols of the known phase, according to the timings detected in a second path search by said second path search part.

15. The communication device as claimed in claim 14, wherein said first channel estimation part includes:

a pilot symbol acquiring part configured to acquire the pilot symbols of the known phase included in a received packet; and a channel estimation part configured to implement a channel estimation using said acquired pilot symbols.

16. The communication device as claimed in claim 14, wherein said second channel estimation part includes:

a tentative data decision information symbol generating pan configured to compensate for the channel variation in accordance with a result of a first channel estimation by said first channel estimation part, and to generate tentative data decision information symbols from the compensated information symbols; and a channel estimation part configured to generate an information symbol that is devoid of modulation components using said tentative data decision information symbols and to implement a second channel estimation by said second channel estimation part using said pilot symbols and information symbols.

17. The communication device as claimed in claim 15, wherein said pilot symbol acquiring pad includes:

a subcarrier acquiring part configured to acquire a plurality of subcarriers included in said reception signal; and a pilot symbol acquiring part configured to acquire a plurality of pilot symbols of a known phase included in said plurality of subcarriers, respectively, wherein said first and second channel estimation parts implement a channel estimation for each of said subcarriers using said plurality of pilot symbols.

18. The communication device as claimed in claim 14, wherein said second channel estimation part recursively implements a path search and a channel estimation by repeating processes of implementing a second channel estimation that estimates a channel variation by using information symbols derived from a signal, demodulated after a first channel estimation of said first channel estimation part according to said timings detected in a second path search of said second path search part and said pilot symbols thereafter implementing the second path search using information symbols derived from a signal demodulated after the second channel estimation and the pilot symbols, and implementing said second channel estimation using information symbols fed back in accordance with the timing detected in said second path search and the pilot symbols.

19. A communication device comprising:

a path search and channel estimation part configured to carry out a path search and a channel estimation using pilot symbols of a known phase included in a signal received via a multipath propagation path and information symbols; and a feedback part configured to feed back said information symbols, wherein said path search and channel estimation part recursively implements the path search and the channel estimation by repeating processes of implementing a path search using information symbols that are decoded after a channel estimation and the pilot symbols and implementing a channel estimation using the information symbols that are fed back via said feedback part in accordance with a timing detected in said path search and the pilot symbols.

* * * * *